(12) United States Patent
Bitar et al.

(10) Patent No.: US 8,032,266 B2
(45) Date of Patent: Oct. 4, 2011

(54) METHOD FOR SELECTING AIRCRAFT ACCESS POINT INTO A LATERAL FREE EVOLUTION AREA

(75) Inventors: Elias Bitar, Toulouse (FR); Nicolas Marty, Saint-Sauveur (FR)

(73) Assignee: Thales (FR)

( * ) Notice: Subject to any disclaimer, the term of this patent is extended or adjusted under 35 U.S.C. 154(b) by 1122 days.

(21) Appl. No.: 11/547,777

(22) PCT Filed: Mar. 22, 2005

(86) PCT No.: PCT/EP2005/051312
§ 371 (c)(1),
(2), (4) Date: Oct. 6, 2006

(87) PCT Pub. No.: WO2005/109138
PCT Pub. Date: Nov. 17, 2005

(65) Prior Publication Data
US 2007/0276553 A1    Nov. 29, 2007

(30) Foreign Application Priority Data
Apr. 9, 2004   (FR) ...................... 04 03769

(51) Int. Cl.
*G01C 21/00* (2006.01)
*G06F 17/00* (2006.01)
*G05D 1/08* (2006.01)
*G08G 5/04* (2006.01)
*G01S 13/94* (2006.01)

(52) U.S. Cl. ....... 701/3; 701/4; 701/7; 701/14; 701/200; 701/300

(58) Field of Classification Search ............... 701/3, 200, 701/300; 342/29, 30
See application file for complete search history.

(56) References Cited

U.S. PATENT DOCUMENTS

| | | | | |
|---|---|---|---|---|
| 3,052,882 A | * | 9/1962 | Pidhayny et al. | 342/29 |
| 3,848,833 A | * | 11/1974 | Rauschelbach | 244/177 |
| 5,382,954 A | * | 1/1995 | Kennedy et al. | 340/961 |
| 5,442,556 A | | 8/1995 | Boyes et al. | |
| 5,706,011 A | | 1/1998 | Huss et al. | |
| 5,892,462 A | | 4/1999 | Tran | |
| 6,433,729 B1 | * | 8/2002 | Staggs | 342/29 |
| 7,634,335 B2 | * | 12/2009 | Bitar et al. | 701/8 |
| 7,634,353 B2 | * | 12/2009 | Meunier et al. | 701/120 |
| 7,668,625 B2 | * | 2/2010 | Bitar et al. | 701/1 |
| 7,739,047 B2 | * | 6/2010 | Meunier et al. | 701/300 |

(Continued)

FOREIGN PATENT DOCUMENTS

| | | |
|---|---|---|
| EP | 0 453 327 A | 10/1991 |
| EP | 0453327 | 10/1991 |
| FR | 2860292 | 4/2005 |
| FR | 2862379 | 5/2005 |
| FR | 2864312 | 6/2005 |
| FR | 2867270 | 9/2005 |
| FR | 2867851 | 9/2005 |

*Primary Examiner* — Khoi Tran
*Assistant Examiner* — Dale Moyer
(74) *Attorney, Agent, or Firm* — Lowe Hauptman Ham & Berner, LLP

(57) ABSTRACT

This method facilitates the joining, by an aircraft, of a secure zone, without constraint of deployment in the horizontal plane, in particular when the latter is threatened by a risk of collision with the ground or by a risk of penetration into a forbidden zone which cannot be resolved by a purely vertical avoidance maneuver. It consists in selecting a point for joining a zone of free lateral deployment by means of a criterion of minimum cost of the initial maneuver of turning at the start of the trajectory for joining the possible points of access to the zones of free lateral deployment.

28 Claims, 13 Drawing Sheets

U.S. PATENT DOCUMENTS

| | | | |
|---|---|---|---|
| 7,826,971 B2 * | 11/2010 | Fontaine et al. | 701/301 |
| 7,881,866 B2 * | 2/2011 | Meunier et al. | 701/301 |
| 7,925,394 B2 * | 4/2011 | Deker et al. | 701/18 |
| 2002/0152029 A1 * | 10/2002 | Sainthuile et al. | 701/301 |
| 2006/0059497 A1 | 3/2006 | Leriche et al. | |
| 2007/0031007 A1 | 2/2007 | Bitar | |
| 2007/0053609 A1 | 3/2007 | Bitar et al. | |
| 2007/0150117 A1 | 6/2007 | Bitar et al. | |
| 2007/0150121 A1 | 6/2007 | Bitar et al. | |
| 2007/0174005 A1 | 7/2007 | Bitar et al. | |
| 2007/0187554 A1 | 8/2007 | Bitar et al. | |

\* cited by examiner

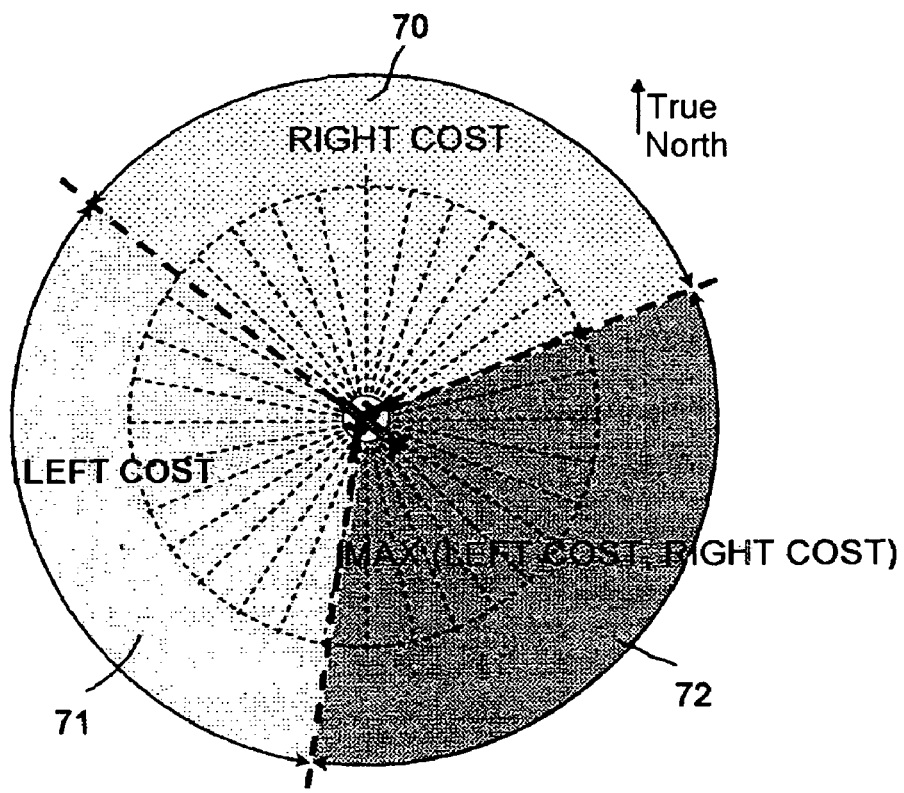
FIG.9
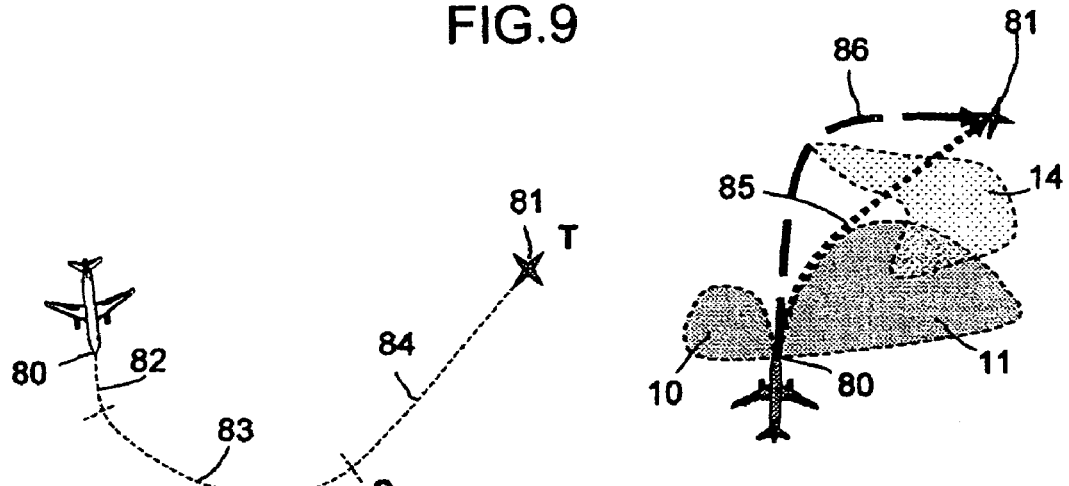
FIG.11
FIG.12

METHOD FOR SELECTING AIRCRAFT ACCESS POINT INTO A LATERAL FREE EVOLUTION AREA

CROSS-REFERENCE TO RELATED APPLICATIONS

The present Application is based on International Application No. PCT/EP2005/051312, filed on Mar. 22, 2005, which in turn corresponds to France Application No. 04/03769 filed on Apr. 9, 2004, and priority is hereby claimed under 35 USC §119 based on these applications. Each of these applications are hereby incorporated by reference in their entirety into the present application.

This application is related to U.S. application Ser. No. 10/519,100 filed on Jun. 27, 2003; U.S. application Ser. No. 10/573,410 filed on Sep. 8, 2004; U.S. application Ser. No. 10/577,063 filed on Oct. 21, 2004; U.S. application Ser. No. 10/583,144 filed on Nov. 30, 2004; and U.S. application Ser. No. 10/590,083 filed on Feb. 8, 2005.

BACKGROUND OF THE INVENTION

1. Field of the Invention

The present invention relates to methods for the joining, by an aircraft, of a secure zone, with a minimum of constraint in the horizontal plane. It deals especially with the case of aircraft threatened by risk of collision with the ground or by a risk of penetration into a forbidden zone which cannot be resolved by a purely vertical avoidance maneuver.

2. Description of the Related Art

Aircraft are increasingly often being equipped with ground proximity warning systems whose role is to prevent aeronautical accidents in which an aircraft which is still maneuverable crashes with the ground, accidents known in the technical literature by the acronym CFIT standing for the expression "Controlled Flight Into Terrain". These ground proximity warning systems produce alerts and alarms to attract the attention of the crew of the aircraft to the need to correct the trajectory of the aircraft but leave, most of the time, to the initiative of the crew, the terrain avoidance trajectories, that is to say the joining of a secure zone, with a minimum of constraint in the horizontal plane, such as the space above a safety altitude greater than the highest reliefs of the region overflown.

Essentially two generations of ground proximity warning systems are known, the first known by the name GPWS (the acronym standing for the expression: "Ground Proximity Warning System") and the second by the name TAWS (the acronym deriving from the expression: "Terrain Awareness Warning System").

GPWS ground proximity warning systems take no account of the flight conditions of the aircraft and only emit alarm messages of the style "terrain, terrain", "Terrain Ahead, pull up" for the attention of the crew of an aircraft. They pose a problem of adjustment of sensitivity, a compromise having to be sought between timely triggering with each true risk of collision with the ground and a minimum of false alarms.

TAWS ground proximity warning systems supplement the information taken into account by GPWSs with navigation data and maps of the relief overflown that are extracted from topographical databases on board or accessible from the aircraft in flight. Moreover they fulfill customary GPWS functions, an additional function of predictive alert of risks of collision with the relief or with obstacles on the ground consisting in alerting the crew of the aircraft when the short-term forecastable trajectory of the aircraft may encounter the ground or an obstacle on the ground and a function of display, on the instrument panel, of a map of the region overflown mentioning the threatening reliefs and obstacles on the ground.

In these TAWS ground proximity warning systems, a risk of collision with the ground is likened to the penetration of the relief in a set of disengagement trajectories, climbing at maximum slope, plotted from the current position of the aircraft, over a certain angular opening in the azimuthal plane about the course of the aircraft since these disengagement trajectories are a compulsory switch, as a last resort, for an aircraft seeking to attain a safety altitude.

Certain TAWS ground proximity warning systems, such as those described in American patents U.S. Pat. No. 5,442,556 or U.S. Pat. No. 5,892,462, actually calculate the elements most representative of the disengagement trajectories within the range of the aircraft from its current position and may therefore propose an avoidance trajectory when they detect a risk of collision with the ground. However, this avoidance trajectory is not necessarily the simplest to implement.

Most ground proximity warning systems of TAWS type have no explicit avoidance trajectory to propose to the crew since, to limit calculational requirements, they merely determine coarsely, one or more protection volumes tied to the aircraft, which extend in front of and beneath the aircraft and are dimensioned in such a way as to contain the majority of the disengagement trajectories within the range of the aircraft, vis-à-vis a possible relief or obstacle on the ground placed in its short-term forecastable trajectory.

There is therefore a requirement for procedures for computing an avoidance trajectory bringing an aircraft threatened by a risk of collision with the ground, into a secure zone where it can deploy freely flat, for the time required for the situation to be taken in hand again. The same requirement makes itself felt for an aircraft threatened with a risk of penetration into a prohibited zone. As an avoidance trajectory is defined mainly by the aim point which must allow the aircraft to access, under the best possible conditions, a zone of free lateral deployment, the problem of the computation of an avoidance trajectory boils down essentially to that of the selecting of a point of a zone of free lateral deployment, which is easy to access for an aircraft from its current position.

SUMMARY OF THE INVENTION

In view of the foregoing it is an object of this invention to provide a point of entry into a zone of free lateral deployment, accessible by an optimal avoidance trajectory, in the sense that it requires only a minimum of maneuvers of the aircraft.

Briefly stated, the present invention is directed to a method based on a minimum cost criterion, for the selection by an aircraft, of a point of access to a zone of free lateral deployment, noteworthy in that the minimum cost criterion encompasses a criterion of minimum cost of the initial turning maneuver at the start of a joining trajectory leading from the current position of the aircraft to the access point.

Advantageously, the minimum cost criterion encompasses a criterion of minimum change of course at the start of the trajectory for joining the access point.

Advantageously, the minimum cost criterion encompasses a criterion of minimum length for the trajectory for joining the access point.

Advantageously, the minimum cost criterion encompasses a criterion of shape of the trajectory for joining the access point making the distinction between the shortest joining trajectories and the joining trajectories side circumventing obstacles.

Advantageously, the cost considered by the criterion of minimum cost of the initial maneuver is the lag required in order for the aircraft to attain a permitted maximum roll angle, to the right for a turn to the right or to the left for a turn to the left.

Advantageously, the cost considered by the criterion of minimum cost of the initial maneuver is the time $\Delta R$ of switching, for the aircraft, from its current roll angle R to the permitted maximum roll angle RM on the side desired with a permitted maximum roll rate RRM.

Advantageously, the time $\Delta R$ of switching, for the aircraft, from its current roll angle R to the permitted maximum roll angle RM on the desired side with a permitted maximum roll rate RRM, is estimated at the value:

$$\Delta R = \frac{RM - \delta R}{RRM}$$

$\delta$ equaling +1 for a turn to the right and −1 for a turn to the left.

Advantageously, the cost considered by the criterion of minimum cost of the initial maneuver is the sum of the time of switching $\Delta R$, for the aircraft, from its current roll angle R to the permitted maximum roll angle RM on the desired side with a permitted maximum roll rate RRM and roll acceleration and deceleration times $\Delta RR$ bracketing the switching time $\Delta R$.

Advantageously, the cost considered by the criterion of minimum cost of the initial maneuver is the sum of the time $\Delta R$ of switching, for the aircraft, from its current roll angle R to the permitted maximum roll angle RM on the desired side with a permitted maximum roll rate RRM and of times $\Delta RR$, at constant roll acceleration and deceleration RAM bracketing the switching time $\Delta R$.

Advantageously, the times $\Delta RR$ at constant roll acceleration and deceleration RAM are estimated at:

$$\Delta RR = 2\frac{RRM}{RAM}.$$

Advantageously, the cost considered is zero when the current roll angle R of the aircraft is close to the permitted maximum roll angle RM on the desired side.

Advantageously, the cost considered by the criterion of minimum cost of the initial maneuver is zero when the current roll angle R corresponds to at least 95% of the value of the permitted maximum roll angle RM on the desired side.

Advantageously, the space surrounding the current position of the aircraft is split into three azimuthal angular spans: a front-right angular span and a front-left angular span of like angular width opening to the right and to the left of the current course of the aircraft, and a rear angular span oriented in the direction opposite to the current course of the aircraft, the front-right angular span being assigned a cost of initial maneuvering of turning to the right, the front-left angular span being assigned a cost of initial maneuvering of turning to the left and the rear angular span being assigned the larger of the costs of initial maneuvering of turning to the right and to the left.

Advantageously, when the method of selecting a point of access to a zone of free lateral deployment is applied to an aircraft provided with equipment giving information on its current position and its current course, its angle, current roll acceleration and rate as well as on the location, with respect to its current position, of contours of reliefs, of threatening obstacles on the ground and/or of forbidden zones, it comprises preparatory steps of location and of delimitation of zones of free lateral deployment in the airspace where the aircraft is deploying consisting in:

locating and delimiting zones adjoining the current position of the aircraft, that are unusable by reason of the limits of maneuverability of the aircraft, locating and delimiting zones that are dangerous by reason of risks of collision with the relief or obstacles on the ground, locating and delimiting zones forbidden by the regulations, and locating and delimiting at various levels of altitude of the airspace where the aircraft is deploying, so-called zones of free lateral deployment, that are sufficiently far from the dangerous or forbidden zones to allow the aircraft to engage without risk flat lateral maneuvers.

Advantageously, when the method of selecting a point of access to a zone of free lateral deployment is applied to an aircraft provided with equipment giving information on its current position and its current course, its angle, current roll acceleration and rate, as well as on the location, with respect to its current position, of contours of reliefs, of threatening obstacles on the ground and/or of forbidden zones, it comprises preparatory steps of evaluation of the situation of the aircraft in its environment consisting in:

determining costs of initial maneuvers of turning to the right and to the left, sectioning the space surrounding the current position of the aircraft into three azimuthal spans tagged in relation to the current course of the aircraft: a front-right span assigned a cost of maneuvering of turning to the right, a front-left span assigned a cost of maneuvering of turning to the left and a rear span assigned the larger of the values of the costs of maneuvering of turning to the right or to the left, and estimating the curvilinear distances and the shortest distances separating the various points of the zones of free lateral deployment, from the current position of the aircraft by taking account of a vertical flight profile for the aircraft and of the zones that it is not practicable to circumvent.

Advantageously, when the method of selecting a point of access to a zone of free lateral deployment is applied to an aircraft provided with equipment giving information on its current position and its current course, its angle, current roll acceleration and rate, as well as on the location, with respect to its current position, of contours of reliefs, of threatening obstacles on the ground and/or of forbidden zones, it comprises:

preparatory steps of location and of delimitation of zones of free lateral deployment in the airspace where the aircraft is deploying consisting in:

locating and delimiting zones adjoining the current position of the aircraft, that are unusable by reason of the limits of maneuverability of the aircraft, locating and delimiting zones that are dangerous by reason of risks of collision with the relief or obstacles on the ground, locating and delimiting zones forbidden by the regulations, and locating and delimiting at various levels of altitude of the airspace where the aircraft is deploying, so-called zones of free lateral deployment, that are sufficiently far from the dangerous or forbidden zones to allow the aircraft to engage without risk flat lateral maneuvers, preparatory steps of evaluation of the situation of the aircraft in its environment consisting in:

determining costs of initial maneuvers of turning to the right and to the left, sectioning the space surrounding the current position of the aircraft into three azimuthal angular spans tagged in relation to the current course of the aircraft: a front-right span assigned a cost of maneuvering of turning to the right, a front-left span assigned a cost of maneuvering of turning to the left and a rear span assigned the larger of the values of the costs of maneuvering of turning to the right or to the left, and estimating the curvilinear distances and the shortest distances separating the various points of the zones of free lateral deployment, from the current position of the aircraft by taking account of a vertical flight profile for the aircraft and of the zones that it is not practicable to circumvent, steps of selection of at least one point of access to a zone of free lateral deployment consisting in:

splitting the space surrounding the current position of the aircraft into permitted and nonpermitted azimuthal angular sectors, the nonpermitted angular sectors being those which intercept dangerous and/or forbidden zones, selecting the points of the zones of free lateral deployment that are situated in the permitted azimuthal angular sectors, analyzing the trajectories for joining the selected points of zone of free lateral deployment, and choosing as joining point, one of the selected points of zone of free lateral deployment, the starting course of whose joining trajectory belongs to the front-right, front-left or rear span assigned the lowest possible cost of initial maneuvering of turning.

Advantageously, when the application of the criterion of minimum cost of initial turning maneuver leads to several possibilities of choices of selected points of zone of free lateral deployment, it is supplemented with a criterion of equality between curvilinear distance and shortest distance, with a criterion of minimum change of course, then with a criterion of minimum length of joining trajectory.

Advantageously, lateral safety margins are added each side of the nonpermitted azimuthal sectors and removed from the permitted azimuthal sectors.

Advantageously, the front-right, front-left and rear azimuthal angular spans each cover 120 degrees.

Advantageously, the space surrounding the current position of the aircraft is sectioned, in the azimuthal plane, into 32 elementary angular sectors.

Advantageously, the various levels of altitude of the space where the aircraft is deploying, where zones of free lateral deployment are located and delimited, lie between the current altitude of the aircraft and the maximum altitude of the relief overflown.

Advantageously, the various levels of altitude of the space where the aircraft is deploying, where zones of free lateral deployment altitude level are located and delimited, correspond to horizontal sections.

Advantageously, the sections of the relief overflown are three in number, one at the level of the current altitude of the aircraft, one at the level of the maximum altitude of the relief overflown and an intermediate.

Advantageously, the search for a point of access to a zone of free lateral deployment is done with the aid of a topological map of the region overflown provided with a location grid.

Advantageously, the location grid is regular distance-wise and aligned with the meridians and parallels.

Advantageously, the location grid is regular distance-wise and aligned with the heading of the aircraft.

Advantageously, the location grid is regular distance-wise and aligned with the course of the aircraft.

Advantageously, the location grid is regular angular-wise and aligned with the meridians and parallels.

Advantageously, the location grid is regular angular-wise and aligned with the heading of the aircraft.

Advantageously, the location grid is regular angular-wise and aligned with the course of the aircraft.

Advantageously, the location grid is radial, centered on the aircraft and oriented along its heading.

Advantageously, the location grid is radial, centered on the aircraft and oriented along its course.

BRIEF DESCRIPTION OF THE DRAWINGS

Other characteristics and advantages of the invention will emerge from the description hereinbelow of a mode of implementation given by way of example. This description will be offered in conjunction with the drawing in which.

a FIG. 1, represents an exemplary map featuring, on a location grid 6, the contours of the two zones adjoining an aircraft 8 and which cannot be used by the latter by virtue of its limits of maneuverability, a FIG. 2 represents, on the same location grid as FIG. 1, the contours of dangerous and/or forbidden zones for an aircraft, a FIG. 3 is a vertical section through the relief along the short-term forecast trajectory of an aircraft illustrating the principle of operation of a TAWS type ground proximity warning system, a FIG. 4 shows a set of three superposed horizontal sections of the space where an aircraft is deploying, useable during a search for zones of free lateral deployment, a FIG. 5 shows the plots of the two possible trajectories for the standby airfield used to determine the width required by an aircraft to be able to freely engage lateral maneuvers, a FIG. 6 represents, on the same location grid as FIGS. 1 and 2, the contours of zones of free lateral deployment that are found in the presence of dangerous and/or forbidden zones assumed to have as contours, those of the dangerous and/or forbidden zones of FIG. 2, FIGS. 7 and 8 represent charts illustrating the main steps of a procedure for determining a cost of turning maneuver for an aircraft, a FIG. 9 represents an orientation rose of the courses showing the distribution of the turning maneuver costs, a FIG. 10 represents, on the same location grid as FIGS. 1, 2 and 6, the contours, in a principally horizontal section, of the space where an aircraft is deploying, of the zones that are impracticable since they are unuseable, dangerous or prohibited as well as zones of free lateral deployment, and the current position of the aircraft with its orientation en course superimposed on an orientation rose of the courses that is divided into azimuthal angular spans of cost of turning maneuver, a FIG. 11 illustrates the conformation of a shortest trajectory for an aircraft, a FIG. 12 illustrates the difference between the concepts of shortest distance and curvilinear distance, a FIG. 13 similar to FIG. 10 with moreover the aim point and the joining trajectory which leads thereto, a FIG. 14 similar to FIGS. 10 and 13 with moreover the representations of nonpermitted azimuthal angular sectors.

DETAILED DESCRIPTION OF THE EMBODIEMENTS

Figure 1:
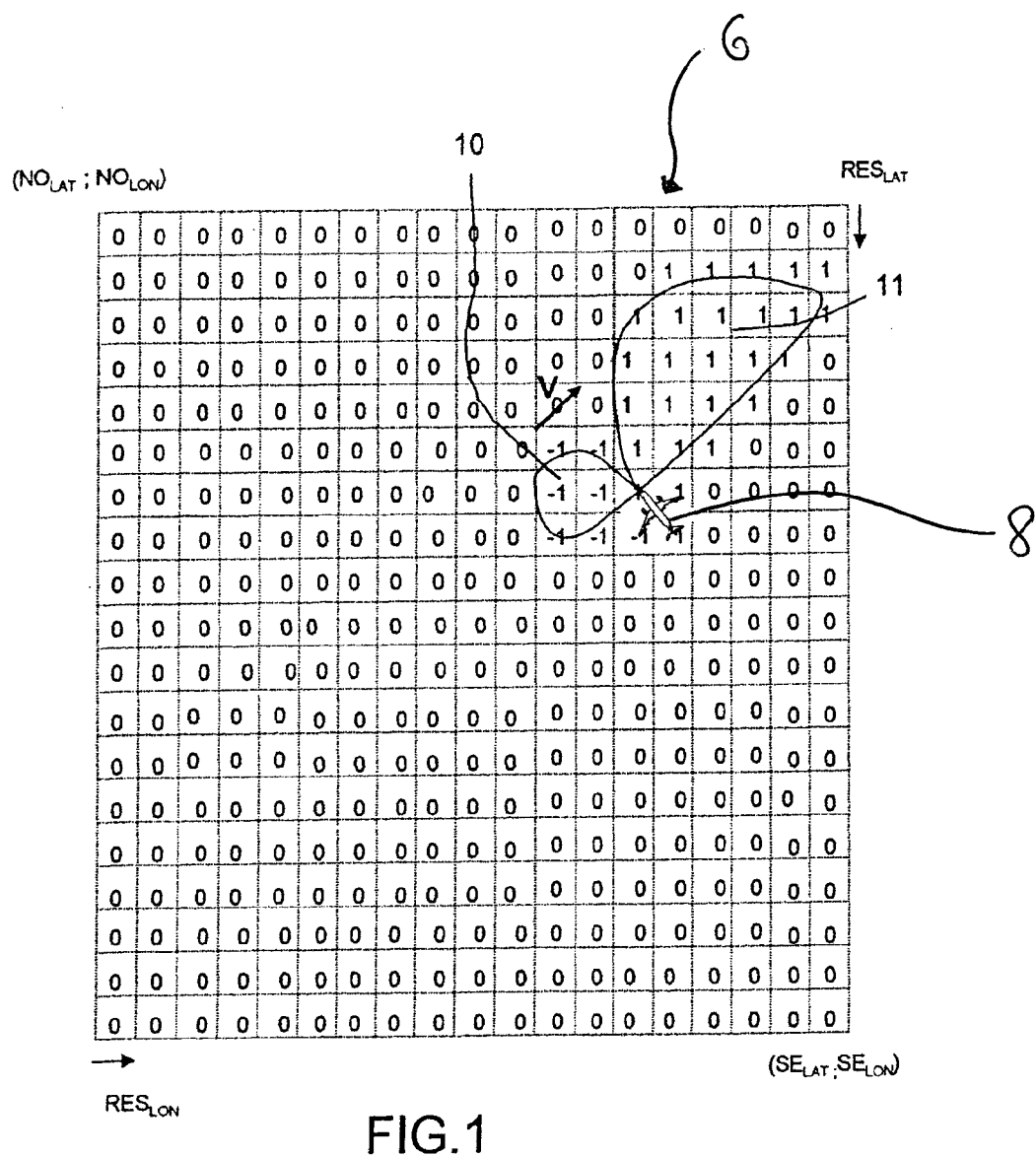

A procedure for searching for zones of free lateral deployment in the airspace where the aircraft is deploying and for selecting in a tagged zone of free lateral deployment, entry points that are optimal from the point of view of the joining trajectory will be described hereinbelow. To facilitate comprehension, the description of this procedure will be structured into three main parts: a first part of location and of delimitation of zones of free lateral deployment in the airspace where the aircraft is deploying, a second part of evaluation of the situation of the aircraft in its environment and a third part of identification and of selection of points of entry of zone of free lateral deployment that are the most easily accessible from the current position of the aircraft. It goes without saying that this does not imply that the order of the operations that is adopted for the description has to be rigorously complied with in a real implementation.

The first part of location and of delimitation of zones of free lateral deployment in the airspace where the aircraft is deploying consists in cataloging and delimiting the impracticable zones:

zones that are unusable by virtue of the limits of maneuverability of the aircraft, zones that are dangerous by virtue of risks of collision with the relief or obstacles on the ground, and/or zones prohibited by the regulations, and deducing therefrom, at various levels of altitude of the airspace where the aircraft is deploying, the locations of sites that are sufficiently far from these impracticable zones to allow the aircraft to engage without risk flat lateral maneuvers.

The second part of evaluation of the situation of the aircraft in its environment consists in:

determining costs of initial maneuvers of turning to the right and to the left, sectioning the space surrounding the current position of the aircraft into three azimuthal spans tagged in relation to the current course of the aircraft: a front-right span assigned a cost of maneuvering of turning to the right, a front-left span assigned a cost of maneuvering of turning to the left and a rear span assigned the larger of the values of the costs of turning, and estimating the curvilinear distances and the shortest distances separating the various points of the tagged zones of free lateral deployment, from the current position of the aircraft by taking account of a vertical flight profile for the aircraft and of the zones that it not practicable to circumvent.

The third part of identification and of selection of a point of entry of zone of free lateral deployment from among the most easily accessible consists in searching for a trajectory for joining a zone of free lateral deployment, which is optimal from the point of view of the turning cost criterion, supplemented possibly with a criterion of maneuver ease (preference for direct trajectories, without circumventing of impracticable zones), with a criterion of minimum change of course and with a criterion of minimum length to be traversed.

The location and the delimitation of the various zones of the airspace where the aircraft is deploying are done by means of a location grid overlaid on the region overflown. This grid may be either:

a grid regular distance-wise, aligned with the meridians and parallels, a grid regular distance-wise aligned with the heading of the aircraft, a grid regular distance-wise aligned with the course of the aircraft, a grid regular angular-wise, aligned with the meridians and parallels, a grid regular angular-wise aligned with the heading of the aircraft, a grid regular angular-wise aligned with the course of the aircraft, a polar (radial) representation centered on the aircraft and its heading, a polar (radial) representation centered on the aircraft and its course. In the subsequent description, use will be made of a location grid regular distance-wise, aligned with the meridians and parallels, and defined by its north-west corners ($NO_{LAT}$ and $NO_{LON}$) and south-east ($SE_{LAT}$ $SE_{LON}$), with for angular resolution, $RES_{LAT}$ on the latitude axis and $RES_{LON}$ on the longitude axis.

In the figures, the tiling elements or mesh cells of the location grid are assigned a lateral constraint flag taking the value 0 if no lateral constraint is present, the tiling element considered belonging to a zone of free lateral deployment, and the value 1 if there are constraints limiting the possibilities of lateral deployment, these constraints possibly going so far as to cause the tiling element considered to be rendered uncrossable.

FIG. 1 illustrates the step of identification of the unusable and hence ineligible zones (lateral constraint flag set to 1) of the airspace where the aircraft is deploying as a consequence of its limited maneuverability.

The zones which the aircraft cannot reach as a consequence of its limited maneuverability are situated inside the tightest turns, which it is capable of performing on its right and on its left. They depend on the turning performance of the aircraft which is dependent on its speed, its heading, its course, local wind conditions and its inertia. With no wind, the zones that are unusable by the aircraft are contained inside two circles adjoining the current position of the aircraft, having a common exterior tangent at this point, oriented along the course or the current heading of the aircraft which then coincide and a radius corresponding to the smallest turning radius acceptable at the moment.

With a crosswind V, the two circles deform into lobes of a cycloid which satisfy the system of equations:

$$\binom{x}{y}(t) = \binom{WS_X \cdot t - \delta \cdot R \cdot \cos(wt + \gamma) + C_X}{WS_Y \cdot t + R \cdot \sin(wt + \gamma) + C_Y} \quad (1)$$

x and y being the abscissa and ordinate coordinates of a point in the geographical reference frame of the location grid, $$\binom{WS_X}{WS_Y}$$

being the wind vector expressed in the geographical reference frame of the location grid,
with $$R = \frac{TAS^2}{g \cdot \tan\varphi_{roll}}$$

$$w = \frac{TAS}{R} = \frac{g \cdot \tan\varphi_{roll}}{TAS}$$

TAS being the amplitude of the airspeed of the aircraft,
$\varphi_{roll}$ being the roll angle of the aircraft during the maneuver,
$\gamma$ being a factor dependent on the initial conditions,
$\delta$ being a coefficient equal to +1 for a turn to the right and −1 for a turn to the left, and
with $$C_x = \text{Long} + \delta . R . \cos(\gamma)$$

$$C_y = \text{Lat} - R . \sin(\gamma)$$

$$\gamma_g = \delta . \text{Heading} + k . \cup$$

long being the longitude of the instantaneous position of the aircraft,
lat being the latitude of the instantaneous position of the aircraft, and
heading being the heading of the aircraft.

The contours of the unusable zones 10, 11 situated immediately to the right and to the left of the current position of the aircraft may be approximated by the first parts of the first two cycloidal lobes going from the current position of the aircraft up to the positions of 180° change of course and by straight line segments joining the positions of 180° change of course to the current position of the aircraft. For further details on the shapes attributable to these unusable zones, reference may be made to the French patent application filed by the applicant on 5 Mar. 2004 under n° 04 02347.

Figure 2:
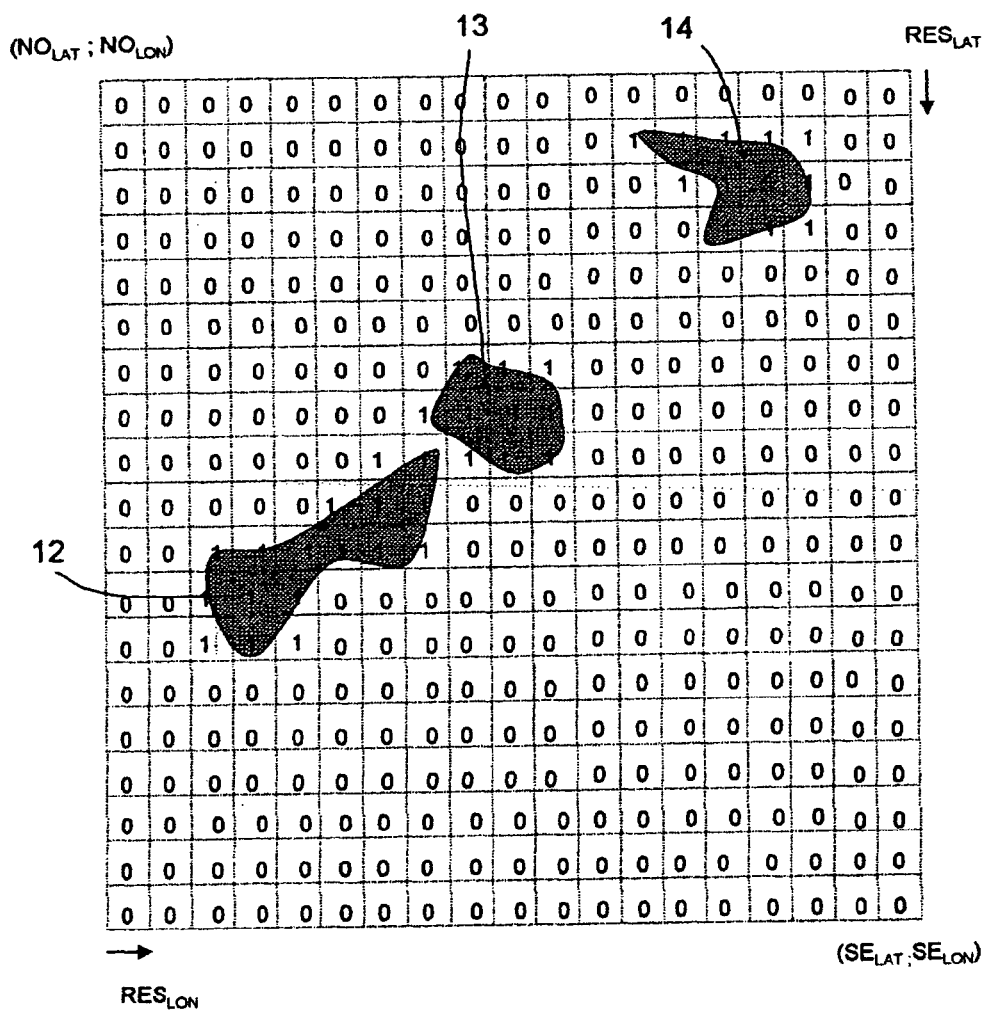

FIG. 2 shows, on the same location grid as FIG. 1 and at the level of a section through the airspace where the aircraft is deploying, the contours of zones 11, 12, 13 that are impracticable for aircraft since they are dangerous by virtue of risk of collision with reliefs or obstacles on the ground, or that are prohibited by regulations. These impracticable and hence ineligible zones 12, 13, 14 (lateral constraint flag set to 1) are signaled by equipment on board the aircraft. For the signaling of the dangerous zones, this may involve a navigation map display device implementing a method for estimating curvilinear distances for a craft subject to dynamic travel constraints, such as the one described in the French patent application filed by the applicant on 26 Sep. 2003 under n° 03 11320 or else, a ground proximity warning system of TAWS type (the acronym deriving from the expression: "Terrain Awareness Warning System"). For the prohibited zones, this may involve an airborne topographic database or one that can be consulted from on board.

The dangerous zones, when they are signaled by a navigation map display device implementing a method of estimating curvilinear distances for a craft subject to dynamic constraints, consist of the zones for which it has not been possible to obtain any estimate of curvilinear distance, no practicable path leading up to them from the current position of the craft having been able to be found, and zones solely accessible in a diverted manner which are signaled by discontinuities in the estimates of curvilinear distances of their points that are unjustified by the relative distances between these points.

Further details in this regard may be found in the French patent application filed by the applicant on 19 Mar. 2004 under n° 04 02870.

Figure 3:
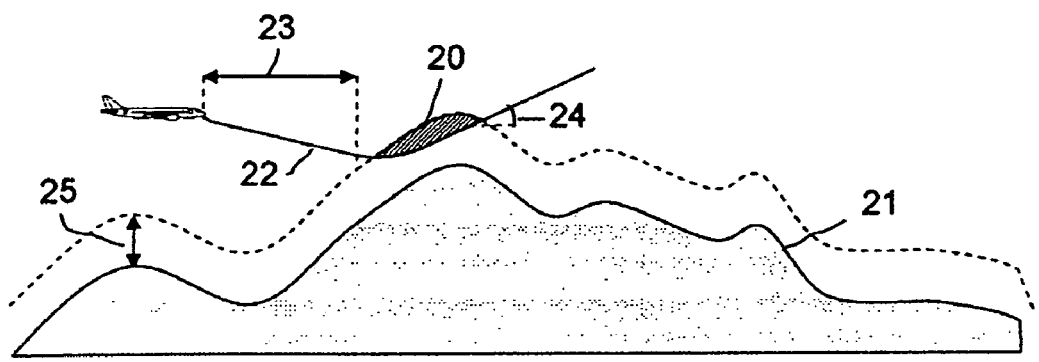

The dangerous zones signaled by a TAWS type ground proximity warning system correspond, as shown in FIG. 3, to the intersection 20 with the relief 21 or obstacles on the ground, of the base of a protection envelope 22 tied to the aircraft clustering together all the trajectories for avoiding the relief via the top, considered as being within the range of the aircraft having regard to a reaction lag 23 accorded to the crew, climb flight performance 24 of the aircraft and a safety margin 25 taken vis-à-vis values of altitude of the relief overflown.

The tagging of the impracticable zones makes it possible to exclude them from the space where the aircraft is deploying so as to delimit a domain for the search of the zones of free lateral deployment.

Once delimited, the domain of search for the zones of free lateral deployment is analyzed by horizontal sections cut at altitude levels chosen arbitrarily for possible flattening-out plateaux of the trajectory of the aircraft.

These sections are staggered between the current altitude of the aircraft and any level whatsoever. When the current altitude of the aircraft is less than the altitude of the highest relief of the region overflown, plus a safety margin, the level of the upper section is preferably taken equal to that of the altitude of the highest relief of the region overflown, plus the safety margin.

The spacing of the sections may depend on the current altitude of the aircraft. It may for example be taken equal to 2000 feet for a current altitude of the aircraft of greater than 7000 feet and to 1000 feet for a current altitude of the aircraft of less than or equal to 7000 feet.

Figure 4:
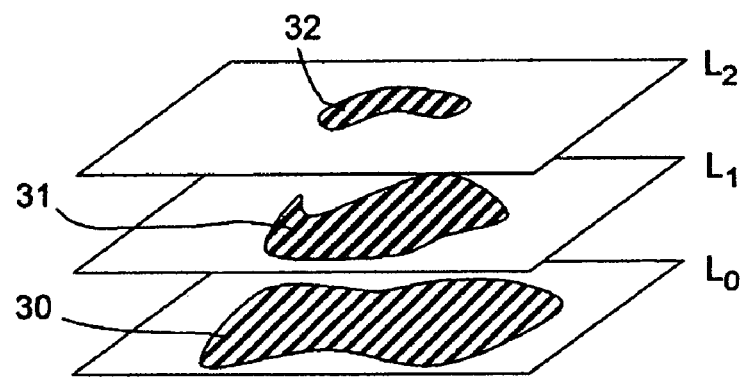

The longitudinal profile of the sections is preferably, completely rectilinear and horizontal as shown in FIG. 4.

The zone of free lateral deployment found will be all the better from the point of view of accessibility and of proximity as there are levels of sections, but there is a downside which is the increase in the search time.

The sections are not necessarily computed simultaneously, but may be computed as and when required. For example, only the first section, at the level of the current altitude of the aircraft is routinely computed, the section immediately above being so only in case of failure of the search for a zone of free lateral deployment in the first section and so on and so forth.

In the example of FIG. 4, the domain of search for the zones of free lateral deployment is analyzed by means of three simple sections of levels: a first section $L_0$ made at the altitude of the current position of the aircraft, a second section $L_2$ made at the maximum altitude of the relief overflown and a third section $L_1$ made at an intermediate altitude.

The zones of free lateral deployment are those whose points are at lateral distances from the contours of the impracticable zones that are greater than a minimal margin $MLTD_{TURN}$ that are sufficient to allow the aircraft to traverse a standby airfield either side of its current trajectory, thereby guaranteeing it the possibility of deploying while engaging flat lateral maneuvers.

This minimum margin $MLTD_{TURN}$ of lateral distance corresponds to the radius of the circle circumscribed about two possible trajectories for the standby airfield plus a safety margin.

Figure 5:
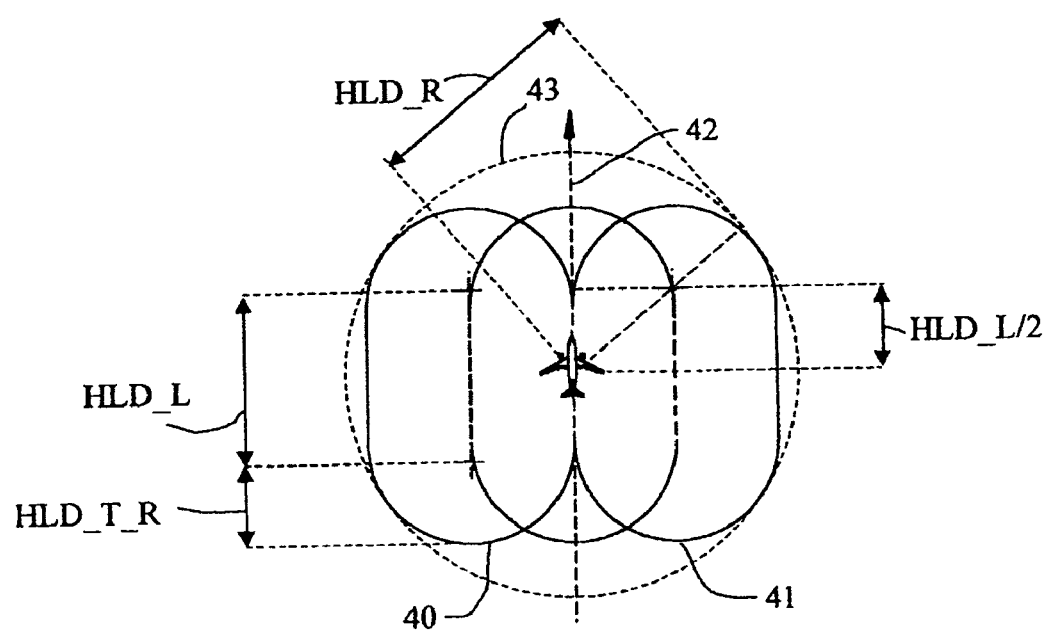

As shown in FIG. 5, the two possible trajectories 40, 41 for the standby airfield form two lobes tangential to the present trajectory 42 of the aircraft. Each of them comprises two lengths HLD_L connected by two half-turns of radius HLD_T.

The value of the lengths HLD_L is a configuration datum defined in terms of flight time or distance traversed on the ground. The value of the radius HLD_T of the half-turns assumed to be effected flat, at ground speed GS and at constant roll angle HLD_B satisfies the relation:

$$HLD\_T = \frac{GS^2}{g \times \tan(HLD\_B)}$$

the ground speed GS being a datum provided by the equipment of the aircraft, HLD_B a configuration datum calculated as a function of the theoretical performance of the aircraft and g the acceleration due to gravity.

The value of the radius HLD_R of the circle 43 circumscribed about two possible trajectories 40, 41 for the standby airfield, satisfies the relation:

$$HLD\_R = HLD\_T + \sqrt{\left(\frac{HLD\_L}{2}\right)^2 + HLD\_T^2}$$

Finally, the lateral distance margin $MLTD_{TURN}$ adopted with respect to the contours of the impracticable zones takes the value:

$$MLTD_{TURN} = HLD\_M + HLD\_T + \sqrt{\left(\frac{HLD\_L}{2}\right)^2 + HLD\_T^2}$$

HLD_M being an additional safety margin with respect to the radius HLD_R of the circle circumscribed about two possible trajectories of the standby airfield.

To obtain the zones of free lateral deployment, the contours of the impracticable zones are enlarged, in the various sections cut through the search domain, by the value found for the lateral distance margin $MLTD_{TURN}$. This enlargement may be done by determining the normal at each point of a contour and by displacing the contour point considered, tagged by its coordinates on the location grid, towards the exterior of the contour, in the direction of the normal and over a distance equal to the value of the lateral distance margin. This enlargement may also be done by means of a chamfer mask distance transform used in the same manner as in the method for determining the lateral margins of a trajectory with respect to the relief, described in the French patent application filed by the applicant on Dec. 19, 2003 under n°. 03 15020.

Figure 6:
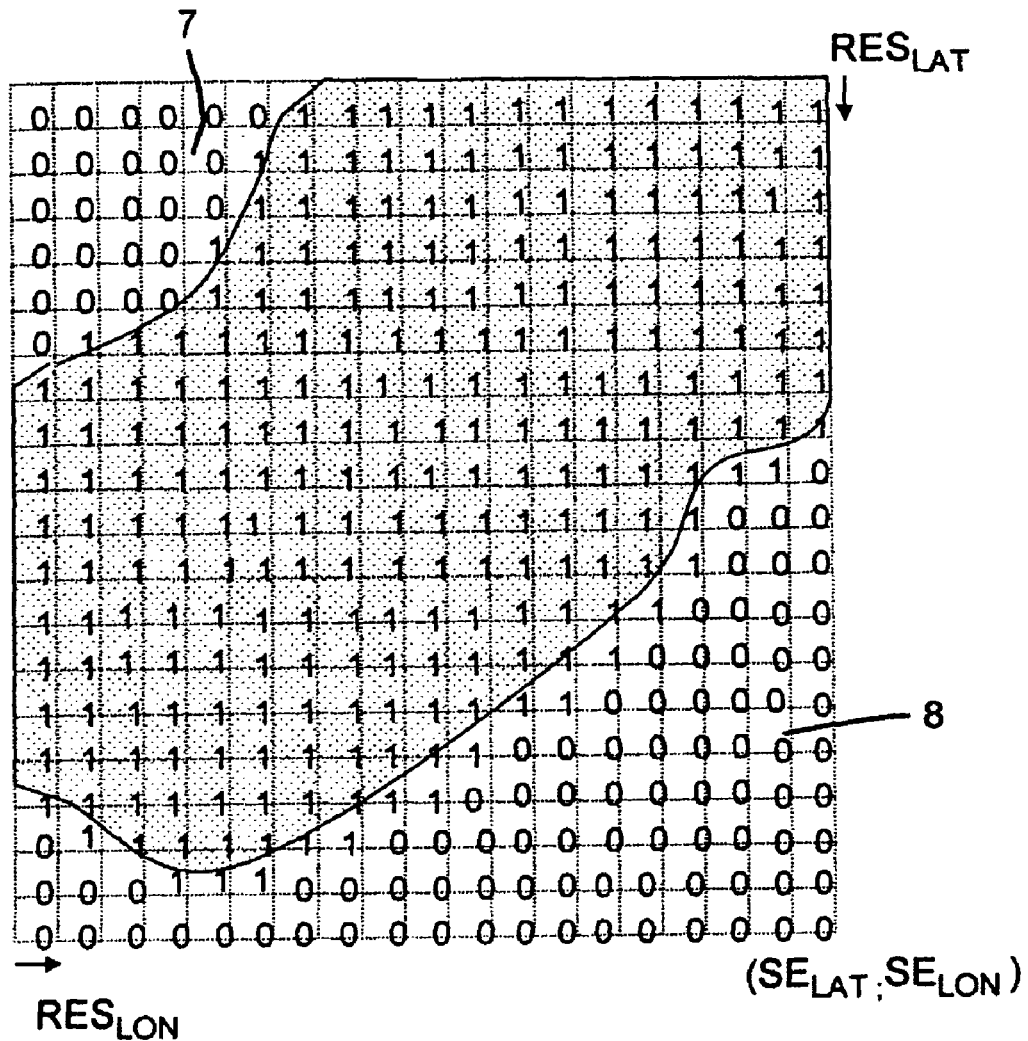

FIG. 6 illustrates the contours of zones of free lateral deployment, hence eligible, 7, 8 (lateral constraint flag set to the value 0) found, after application of the lateral distance margin $MLTD_{TURN}$ to the contours of the impracticable zones shown in FIG. 2.

The determination of the contours of the zones of free lateral deployment in the section under analysis or in the whole set of sections of the airspace where the aircraft is deploying terminates the phase of evaluation of the environment of the aircraft.

The phase of evaluation of the situation of the aircraft in its environment consists in estimating the lags or costs of the right or left turning maneuvers.

The turning of an aircraft can be broken down into three phases: a first phase of acceleration of the roll, a second phase of instigating roll and a third phase of deceleration of the roll.

For the study of their respective durations, the following notation is used:
R: the roll angle of the aircraft,
RR: the roll rate of the aircraft,
RA: the roll acceleration of the aircraft,
RM: Roll-Angle Max, the maximum roll angle used for the maneuver.
RRM: Roll-Rate Max, the maximum roll rate used for the maneuver,
RAM: Roll-Acceleration Max, the maximum roll acceleration used,
t1: the duration required for phase 1,
t2: the duration required for phase 2,
t3: the duration required for phase 3, $$\delta = \begin{vmatrix} 1 \text{ for a left bank} \\ +1 \text{ for a right bank} \end{vmatrix}.$$

It is moreover supposed that:
the phases are symmetric for an instigation of turning and exit from turning.
the time reference is reset to zero for each phase described.
during the roll acceleration, the roll rate increases from 0 to RRM with a constant acceleration RAM.
during the instigation of roll, the roll increases with a constant rate RRM up to a value RM.
during the roll deceleration, the roll rate decreases down to 0 with a constant deceleration RAM.

Under these assumptions, in the first phase of acceleration of the roll, the initial conditions are, for the roll acceleration ROLL_ACC(t) of the aircraft:

ROLL_ACC($t$)=δ×RAM and, for the roll rate ROLL_RATE(t) of the aircraft:

ROLL_RATE($t$)=δ×RAM×$t$ with

ROLL_RATE(0)=0

Assuming that the roll angle ROLL_ANGLE(t) of the aircraft starts from a zero value:

ROLL_ANGLE(0)=0 it takes over time the value:

$$ROLL\_ANGLE(t) = \frac{1}{2} \times \delta \times RAM \times t^2.$$

The end of this first phase of acceleration of the roll is attained after a duration $t_1$ such that:

ROLL_RATE($t_1$)=δRM

This duration $t_1$ therefore equals:

$$t_1 = \frac{RRM}{RAM}$$

and the roll angle increases, at the end of this first phase, by the value:

$$ROLL\_ANGLE(t_1) = \frac{1}{2} \times \delta \times \frac{RRM^2}{RAM}$$

In the second phase of instigation of roll, the initial conditions are: for the roll acceleration ROLL_ACC(t) of the aircraft:

ROLL_ACC(t)=0 and, for the roll rate ROLL_RATE(t) of the aircraft:

ROLL_RATE(t)=δ×RRM with an initial roll angle ROLL_ANGLE(0) equal to:

$$ROLL\_ANGLE(t_1) = \frac{1}{2} \times \delta \times \frac{RRM^2}{RAM} + R$$

which takes over time the value:

$$ROLL\_ANGLE(t_1) = \delta \times RRM \times t + \frac{1}{2} \times \delta \times \frac{RRM^2}{RAM} + R$$

The end of this second phase of instigation of roll is attained, by symmetry with the first phase (the third phase of deceleration being assumed to have a duration equal to the first phase of acceleration), after a duration $t_2$ such that:

$$ROLL\_ANGLE(t_2) = \delta \times \left(RM - \frac{1}{2} \times \frac{RRM^2}{RAM}\right)$$

The final value is obtained by symmetry with the first phase so that we have:

$$t_2 = \frac{RM - \delta R}{RRM}$$

and the angle of roll at the end of this second phase attains the value:

$$ROLL\_ANGLE(t_2) = \delta \times \left(RM - \frac{1}{2} \times \frac{RRM^2}{RAM}\right)$$

In the third phase of deceleration of the roll, the initial conditions are: for the roll acceleration ROLL_ACC(t) of the aircraft:

ROLL_ACC(t)=−δ×RAM and, for the roll rate ROLL_RATE(t) of the aircraft:

ROLL_RATE(t)=−δ×RAM×t+δ×RRM with

ROLL_RATE($t_3$)=0

The roll angle ROLL_ANGLE(t) during this third phase equals:

$$ROLL\_ANGLE(t) = -\frac{1}{2} \times \delta \times RAM \times t^2 + \delta \times RRM \times t + K_{ROLL\_ANGLE\_3}$$

with, finally, at time $t_3$, the value:

ROLL_ANGLE($t_3$)=δ×RM and $$K_{ROLL\_ANGLE\_3} = \delta \times RM - \frac{1}{2} \times \delta \times \frac{RRM^2}{RAM}$$

The end of this third phase of roll deceleration is attained after a duration $t_3$ such that:

$$t_3 = \frac{RRM}{RAM}$$

with a final angle of roll:

ROLL_ANGLE($t_3$)=δ×RM

To summarize, the lag in switching, with a maximum roll rate RRM, from a roll angle R to a maximum roll angle RM may be likened as a first approximation to the sum of a time:

$$\Delta R = \frac{RM - \delta R}{RRM}$$

corresponding to the duration $t_2$ of the second phase during which the variation in roll angle is effected at the maximum permitted speed RRM and of a time:

$$\Delta RR = 2 \times \frac{RRM}{RAM}$$

corresponding to the first and third phases of acceleration and of deceleration of the roll.

The estimation of the cost of a maneuver of turning to the right or to the left of the aircraft is based on the likening to the sum of the times ΔR and ΔRR of the lag required for the aircraft to switch from its current roll angle to the maximum roll angles and to turn in the shortest possible manner to the right or to the left.

More precisely, the value adopted for the cost of instigating turning is the time ΔR required for the aircraft to switch from its current roll angle to the maximum roll angle RM tailored to the shortest possible turning in the desired direction, performed at the maximum permitted roll rate, with a possible cost overhead consisting of the time ΔRR of inversion of the roll rate when this proves to be necessary (for example during the shortest possible turn to the right while the aircraft is already engaged in a turn to the right but is in the process of flattening out). A threshold effect, which consists in zeroing the cost as soon as the current roll angle is at least equal to 95% of the final value RM of the maximum roll angle desired, makes it possible to smooth the oscillations in the phase of capture of the final roll angle.

Figure 7:
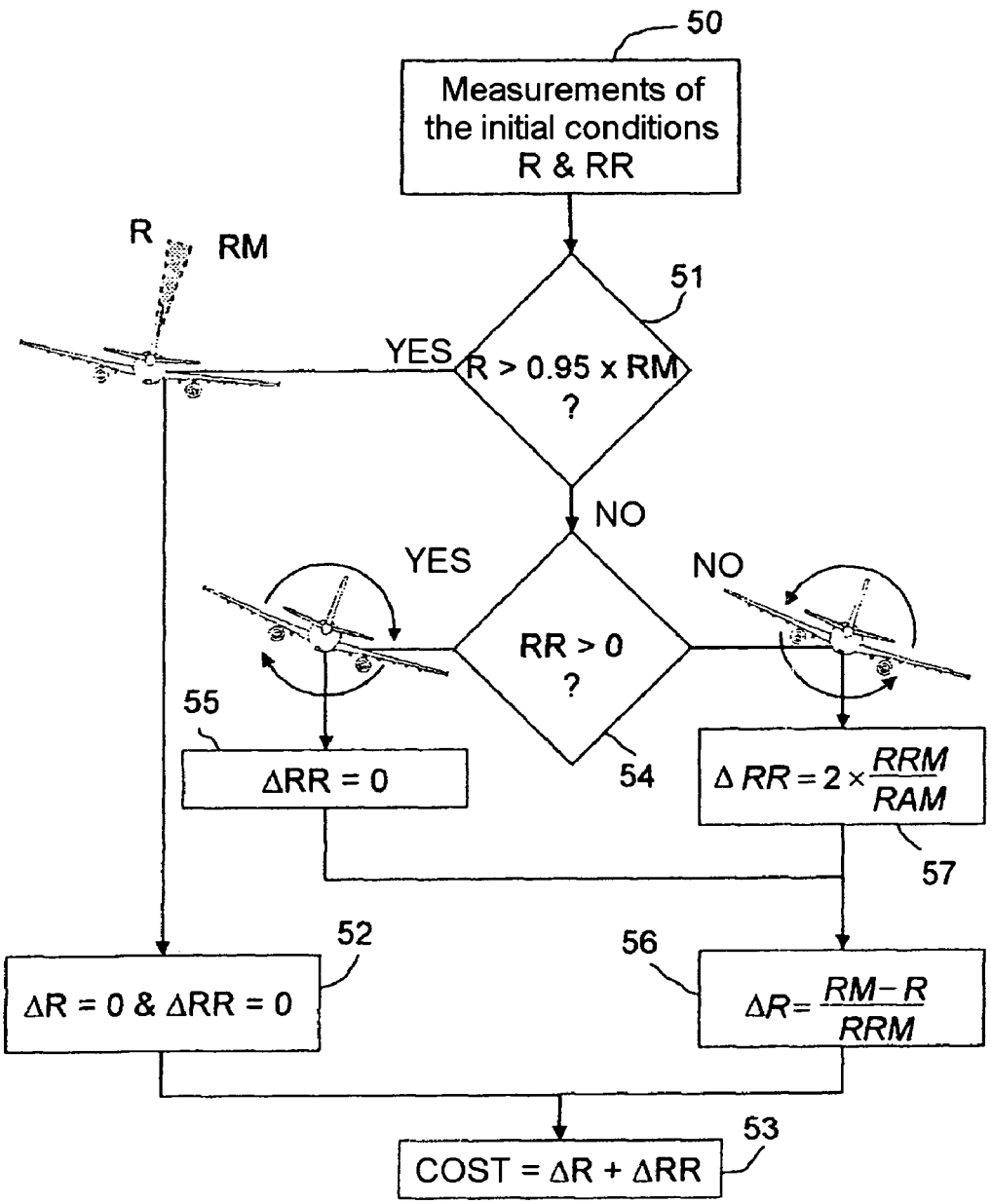
Figure 8:
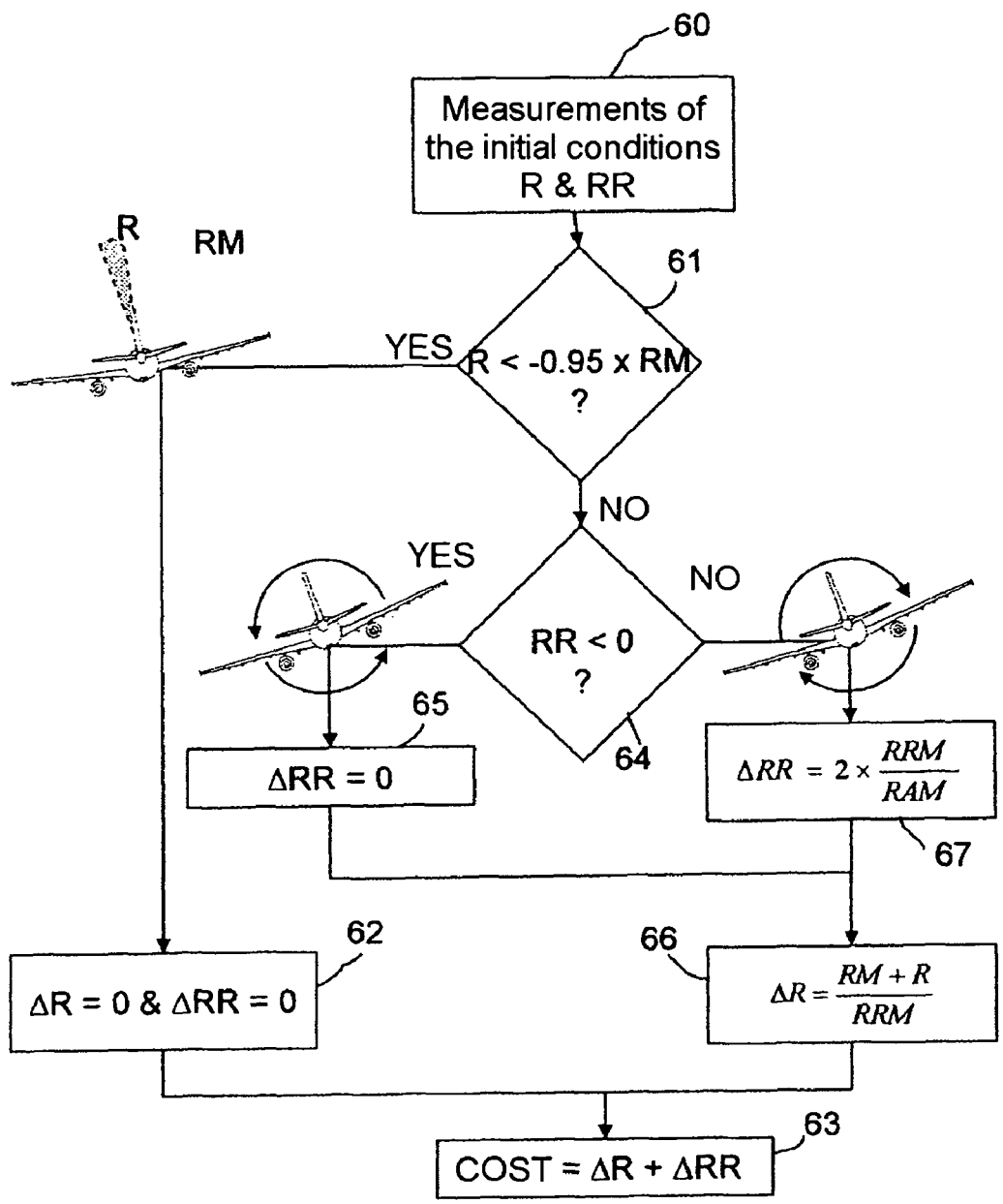

The charts of FIGS. 7 and 8 illustrate this mode of allocating a cost to the turning instigation maneuvers of the aircraft, FIG. 7 for instigation of a roll to the right and FIG. 8 for instigation of a roll to the left.

For instigation of a roll to the right (FIG. 7), the estimation of the cost begins with the collecting at 50 of the values of the angle R of the current roll and of the current roll rate RR from the onboard instruments of the aircraft and with a test at 51 consisting in comparing the value of the current roll angle R of the aircraft with the value of the final roll angle RM to determine whether the current roll angle R is greater than 95% of the final roll angle.

When the value of the current roll angle R is greater than 95% of that of the final roll angle RM, the variables ΔRR and ΔR are set to zero at 52 and added together at the output 53 to give a zero cost.

When the value of the current roll angle R is less than or equal to 95% of that of the final roll angle RM the estimation of the cost is continued at 54 by a test on the sign of the current roll rate RR of the aircraft.

If the current roll rate RR is positive, indicating that the roll angle of the aircraft is evolving in the direction of the final roll angle RM, there is no cost overhead related to the change of sign of the roll rate. The variable ΔRR is set to zero at 55. The variable ΔR is set at 56, to the value:

$$\Delta R = \frac{RM - R}{RRM}$$

Next, these variables are added together at the output 53 to give a cost which equals:

$$COST = \frac{RM - R}{RRM}.$$

If the current roll rate RR is negative or zero indicating that the roll angle of the aircraft is evolving in a direction counter to the final roll angle RM or is not evolving, there is a cost overhead related to the change of sign of the roll rate. The variable ΔRR is set at 57 to the value:

$$\Delta RR = 2\frac{RRM}{RAM}$$

The variable ΔR is set at 56 to the value:

$$\Delta R = \frac{RM - R}{RRM}$$

Next, these variables are added together at the output 52 to give a cost which equals:

$$COST = \frac{RM - R}{RRM} + 2\frac{RRM}{RAM}$$

For instigation of a roll to the left (FIG. 8), the estimation of the cost begins with the collection at 60 of the values of the angle R of the current roll and of the current roll rate RR from the onboard instruments of the aircraft and with a test at 61 consisting in comparing the value of the current roll angle R of the aircraft with the value of the final roll angle RM to determine whether the current roll angle R is less than minus 95% of the final roll angle.

When the value of the current roll angle R is less than minus 95% of that of the final roll angle RM the variables ΔRR and ΔR are set to zero at 62 and added together at the output 63 to give a zero cost.

When the value of the current roll angle R is greater than or equal to minus 95% of that of the final roll angle RM the estimation of the cost is continued at 64 by a test on the sign of the current roll rate RR of the aircraft.

If the current roll rate RR is negative, indicating that the roll angle of the aircraft is evolving in the direction of the final roll angle RM, there is no cost overhead related to the change of sign of the roll rate. The variable ΔRR is set to zero at 65. The variable ΔR is set at 66 to the value:

$$\Delta R = \frac{RM + R}{RRM}$$

Next, these variables are added together at the output 63 to give a cost which equals:

$$COST = \frac{RM + R}{RRM}$$

If the current roll rate RR is positive or zero indicating that the roll angle of the aircraft is evolving in a direction counter to the final roll angle RM or is not evolving, there is a cost overhead related to the change of sign of the roll rate. The variable ΔRR is set at 67 to the value:

$$\Delta RR = 2\frac{RRM}{RAM}$$

The variable ΔR is set at 66 to the value:

$$\Delta R = \frac{RM + R}{RRM}$$

Next, these variables are added together at the output 63 to give a cost which equals:

$$COST = \frac{RM + R}{RRM} + 2\frac{RRM}{RAM}$$

In possession of the costs of the right and left turning instigation maneuvers, the course orientation rose is split, as shown in FIG. 9, at the site of the current position of the aircraft, into three azimuthal angular spans: a front-right azimuthal angular span 70 and a front-left azimuthal angular span 71 of like angular width opening to the right and to the left of the current course of the aircraft, and a rear azimuthal angular span 72 oriented in a direction opposite to the current course of the aircraft and a course belonging to the front-right azimuthal angular span 70 are assigned the cost estimated previously for a right turning maneuver, the courses belonging to the front-left azimuthal angular span 71 are assigned the cost estimated previously for a left turning maneuver and the courses belonging to the rear azimuthal angular span 72 are assigned the maximum cost estimated previously for the two maneuvers of turning to the right and to the left. This terminates the part for evaluating the situation of the aircraft in its environment.

The location and delimitation of the zones which are impracticable because they are unusable by virtue of the limited maneuverability of the aircraft, which are dangerous by virtue of risks of collision with the ground or are prohibited as a consequence of administrative decisions, and which have culminated in the location of zones of free lateral deployment in various horizontal sections through the airspace where the aircraft is deploying, and the evaluation of the situation of the aircraft in its environment with the establishment of the costs of the initial turning maneuvers, make it possible to establish a general overview, in the form of maps, of the situation of an aircraft within the space where it is deploying.

Figure 10:
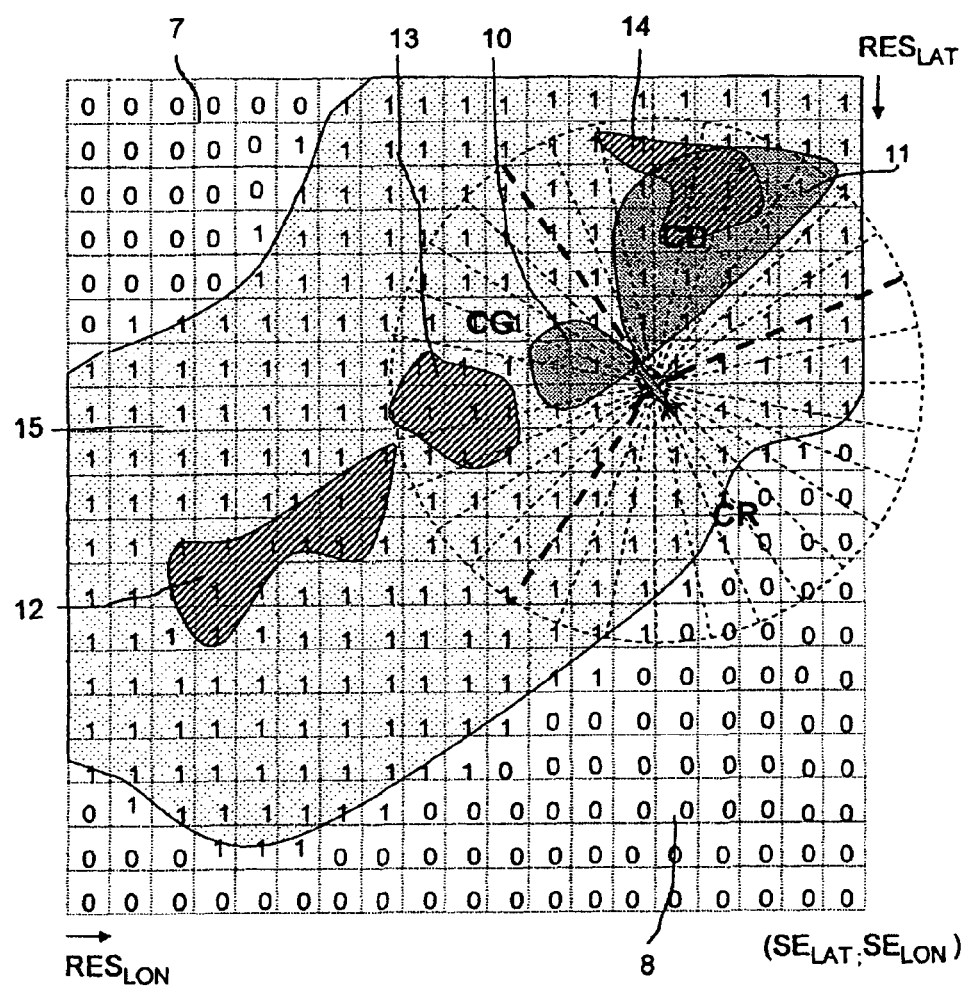

FIG. 10 gives the example of a map effecting a general overview, of the situation at the level of the same section as FIGS. 2 and 6, for an aircraft following a north-west passage between the two impracticable zones 13, 14 already tagged in FIG. 2. In this FIG. 10, the mesh cells of the location grid are assigned a lateral constraint flag set to the value 0 when they belong to practicable zones with no lateral deployment constraint, and to the value 1 when they belong to zones that are either impracticable, or practicable with lateral deployment constraints. The contours of the two zones 10, 11 which adjoin the current position of the aircraft and are unusable on account of the limited maneuverability of the aircraft as well as the contours of the zones 12, 13, 14 which are impracticable on account of a risk of collision with the ground or of administrative prohibitions are depicted. The impracticable zones 12, 13, 14 are encompassed within a wide zone 15 which is practicable but with lateral deployment constraints (lateral constraint flag set to the value 1), which leaves room at its periphery for zones of free lateral deployment 7, 8 (lateral constraint flag set to the value 0). Depicted also is the aircraft in its current position, at the center of a courses orientation rose split into three azimuthal angular spans referenced with respect to the aircraft: a front-right span CD assigned a cost of turning to the right, a front-left span CG assigned a cost of turning to the left and a rear span CR assigned a maximum cost of turning.

The general overview, shown in FIG. 10, of the situation of the aircraft in map form gives the sites of the zones of free lateral deployment in relation to the current position of the aircraft and informs the crew of the aircraft as regards the possible joining routes (those which circumvent the impracticable zones) while mentioning the presence of lateral deployment constraints when there is reason.

To utilize it further, two other maps employing the same location grid are adjoined to this general overview map: a map of the shortest distances taking account only of the unusable zones 10, 11 and a map of the curvilinear distances taking account of all of the impracticable zones 10, 11, 12, 13, 14.

The map of shortest distances and the map of curvilinear distances are computed on the basis of topological data derived from a database such as a terrain elevation database onboard or that can be consulted from on board the aircraft, for example, by using a chamfer mask distance transform as is described in the French patent application filed by the Applicant on 26 Sep. 2003 under n°. 03 11320. Their addition to the situation overview map is conveyed by the adding to the lateral constraint flag of each mesh cell of the location grid, of a value of shortest distance and of a value of curvilinear distance.

The shortest trajectory for an aircraft is the shortest path that it can follow to reach an aim point having regard to its maneuverability. As shown in FIG. 11, this shortest trajectory consists, in the horizontal plane:

of a rectilinear segment 82 starting from its current position 80, and related to the inertia of the aircraft during turning to steer itself towards the aim point 81, of an arc of a cycloid 83 corresponding to the turning of the aircraft pushed by the crosswind until it reaches the azimuth of the aim point, and of a rectilinear segment 84 between the exit of the turning and the aim point 81.

In the vertical plane, the shortest trajectory is contingent on the climb and descent capabilities of the aircraft as well as the prescribed altitudes.

FIG. 12 shows the difference appearing between the shortest distance and the curvilinear distance of a point 81 with respect to the current position 80 of an aircraft, when an impracticable zone 14 interposes itself between the two. The shortest distance is the length of the route 80 ignoring the impracticable zone 14. The curvilinear distance is the length of the shortest route 86 circumventing the impracticable zone 14. As may be seen, when an impracticable zone 14 interposes itself between an aim point 81 and the aircraft's current position 80 taken as origin of the distance measurements, the curvilinear distance is larger than the shortest distance. Thus, the fact of associating a shortest distance and a curvilinear distance with each mesh cell of the location grid makes it possible to ascertain, by simple comparison of the two values, whether the aircraft does or does not require to make a detour to reach this mesh cell. This observation is important since the need for a detour signifies a joining trajectory involving more maneuvers than a shortest trajectory.

Figure 13:
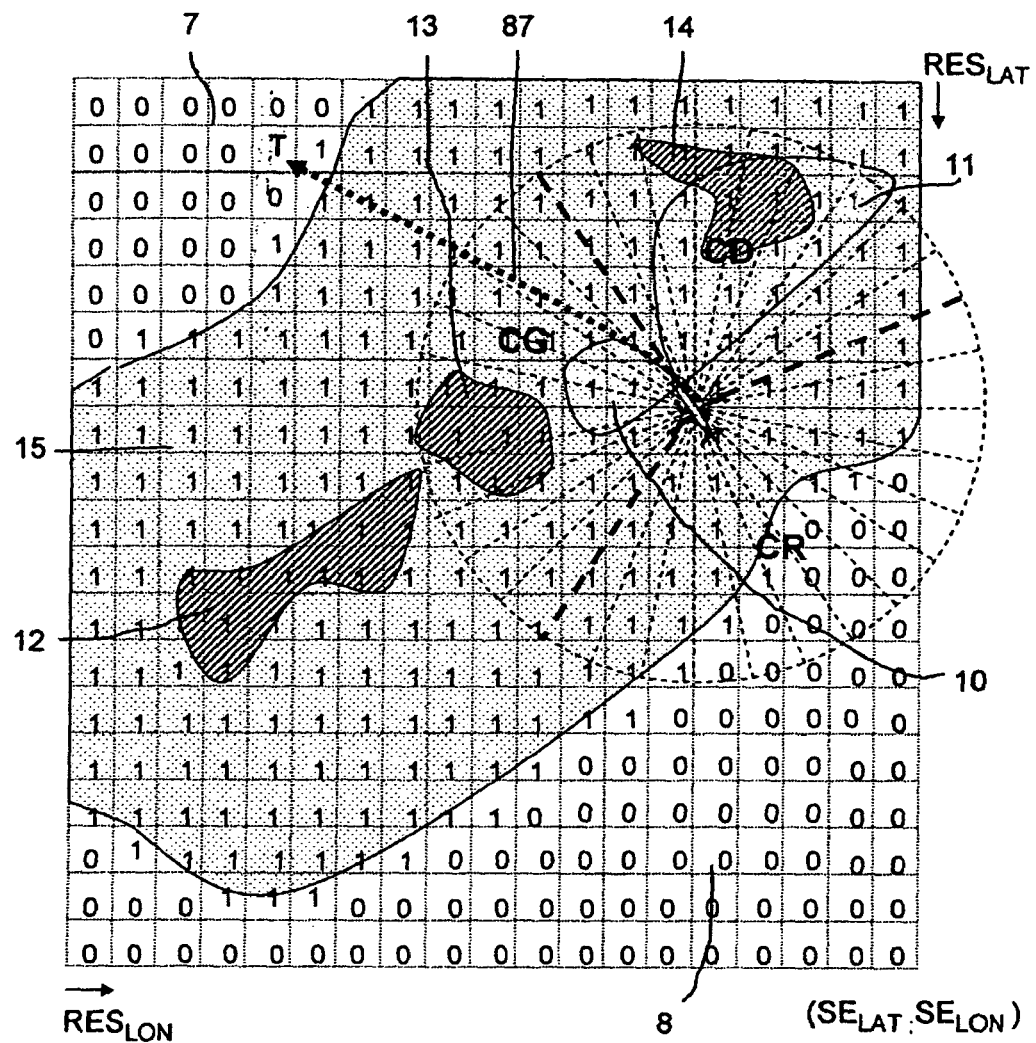

The selection of an optimal trajectory for joining a zone of free lateral deployment located with respect to the current position of the aircraft on a map amounts in fact, as shown in FIG. 13, to choosing from among the mesh cells of the location grid belonging to zones of free lateral deployment (lateral constraint pointer set to the value 0), that one T whose joining trajectory 87 from the current position of the aircraft, is the most convenient.

The evaluation of the convenience, for an aircraft, of a point of access to a zone of free lateral deployment is based on a criterion of minimum cost of the initial maneuver of turning at the commencement of the joining trajectory, possibly combined with other criteria such as a criterion of minimum maneuvers during the traversal of the joining trajectory, a criterion of minimum change of course or a criterion of minimum distance traversed.

The implementation of a criterion of minimum cost of the initial maneuver of turning may be done by plotting the joining trajectories in turn, from the current position of the aircraft, for the various mesh cells of the location grid of the situation overview map (FIG. 10) belonging to zones of free deployment (lateral constraint pointer set to the value 0), to determine the deviations of their initial courses with respect to the current course of the aircraft and hence the front-right CD, front-left CG or rear CR azimuthal spans belonging to the initial courses and the associated costs. The plots of the joining trajectories which take account of all the zones which are impracticable to circumvent (unusable zones, dangerous zones and prohibited zones) may be obtained, for example by the method of determining a route of minimum length in the presence of obstacle described in the French patent application filed by the Applicant on 18 Nov. 2003 under n°. 03 13494, which method consists in superimposing two maps of distances: the usual map of distances having as origin of the distance measurements the current position of the aircraft and another map of distances having the aim point as origin of the distance measurements, in adding together the distance values obtained for one and the same mesh cell of the location grid and in choosing as plot of the joining trajectory, a plot following mesh cells assigned a sum of distances having a minimum value.

The implementation of a criterion of minimum maneuvers may be reduced to a requirement of minimum change of course or be extended to a requirement of minimum change of course and of shortest trajectory, the identification of a shortest trajectory being done by verifying the equality between shortest distance and curvilinear distance, the shortest distance being determinable by means of a distance transform taking account only of the zones that are nonusable by virtue of the limited maneuverability of the aircraft or, in an even more approximate manner on the basis of the differences between the values of the coordinates, in the location grid, of the current position of the aircraft and of the aim point, by simple application of the theorem of Thales.

The implementation of a criterion of minimum distance traversed can be done on the basis of the curvilinear distances associated with the various mesh cells of the location grid of the situation overview map (FIG. 11) belonging to zones of free deployment (lateral constraint pointer set to the value 0).

It is possible to avoid the plotting of the trajectories for joining the mesh cells of the location grid that were tested during the implementation of the criterion of minimum cost at the initial maneuver of turning if the assumption is made of the existence of a zone of free deployment accessible by a shortest trajectory. This assumption is not very penalizing since it is always possible to resort to the plot of the joining trajectories if said assumption turns out to be unfounded.

To avoid the plotting of the joining trajectories going from the current position of the aircraft to the various mesh cells of the location grid belonging to zones of free lateral deployment, the angular sectors of the front-right CD, front-left CG and rear CR azimuthal spans about the current position of the aircraft, which do not intercept dangerous or forbidden zones and which are termed "permitted sectors", the complementary sectors being termed "nonpermitted sectors", are identified and the horizon is scanned in the permitted sectors by taking the azimuthal spans: front-right CD, front-left CG and rear in ascending order of cost of initial maneuver of turning, to retain as access point, the closest of the mesh cells of the location grid belonging to a zone of free lateral deployment (lateral constraint flag set to the value 0) spotted first.

Figure 14:
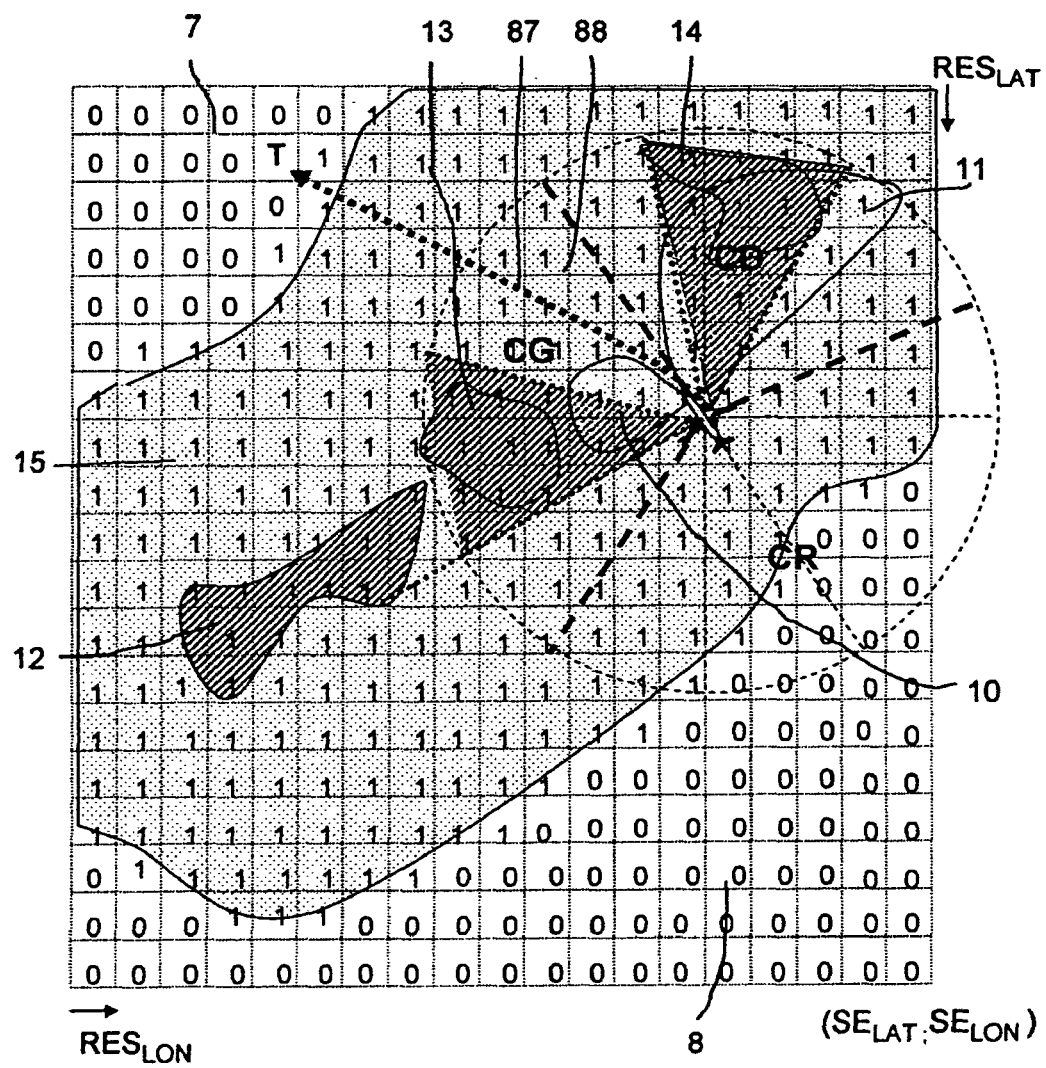

In FIG. 14 which reproduces the situation of FIG. 13, the nonpermitted sectors which intercept dangerous or prohibited zones 13, 14 are hatched. The permitted sectors, which are the complementary sectors of the courses orientation rose are split by the front-right CD, front-left CG and rear CR azimuthal spans. In the flight situation represented which corresponds to a crosswind oriented south-west north-east, the cost of the initial maneuver of turning is a minimum for a turn to the left, so that the first angular sector scanned is the part of the permitted angular sector 88 intercepting the front-left azimuthal span CG and that the mesh cell of the location grid retained as point of access to a zone of free lateral deployment is the mesh cell T of the zone of free lateral deployment 7.

Figure 15A:
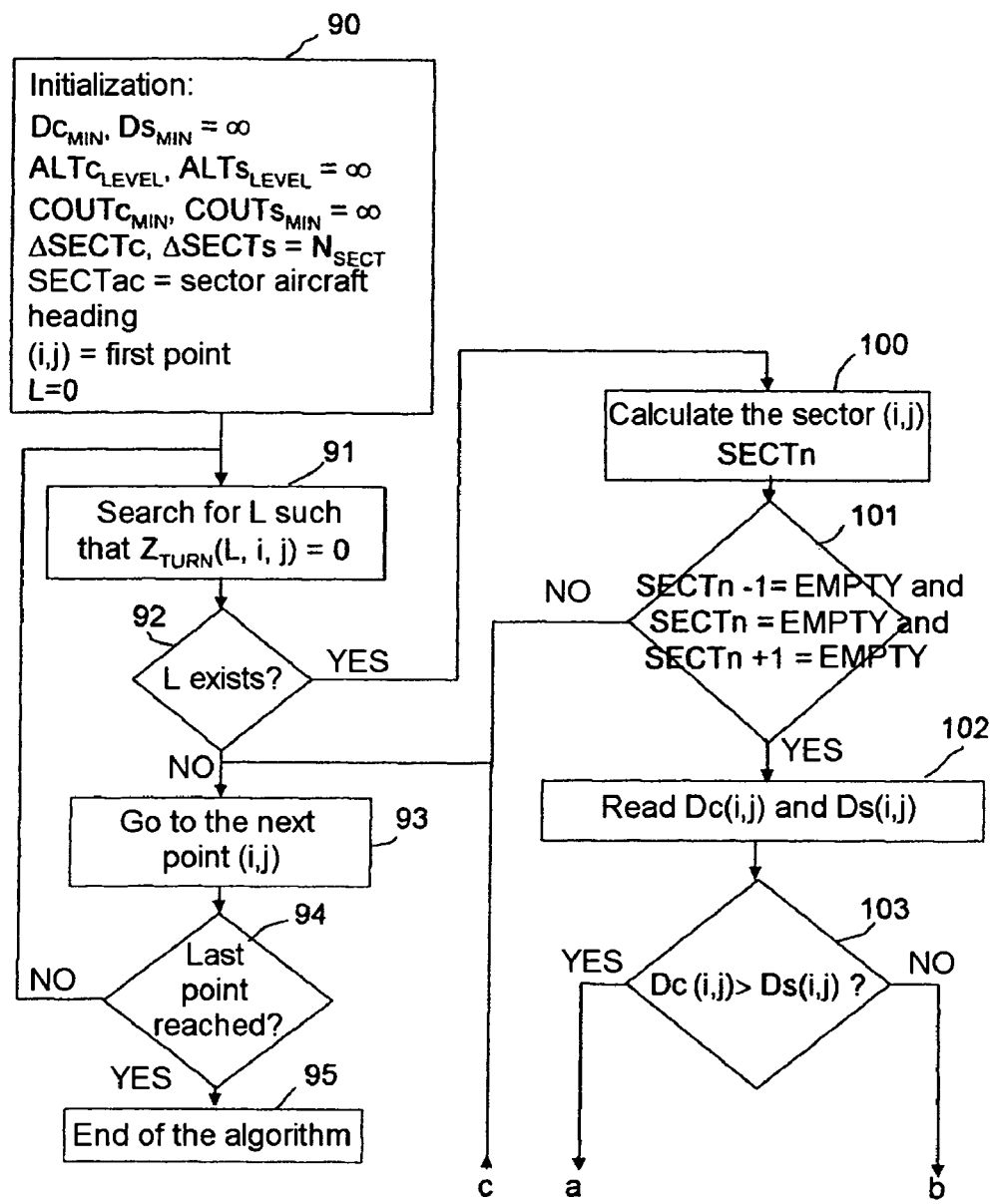
FIGS. 15a and 15b represent a chart illustrating the main steps of a procedure for selecting optimal points of access, of zone of free lateral deployment.
Figure 15B:
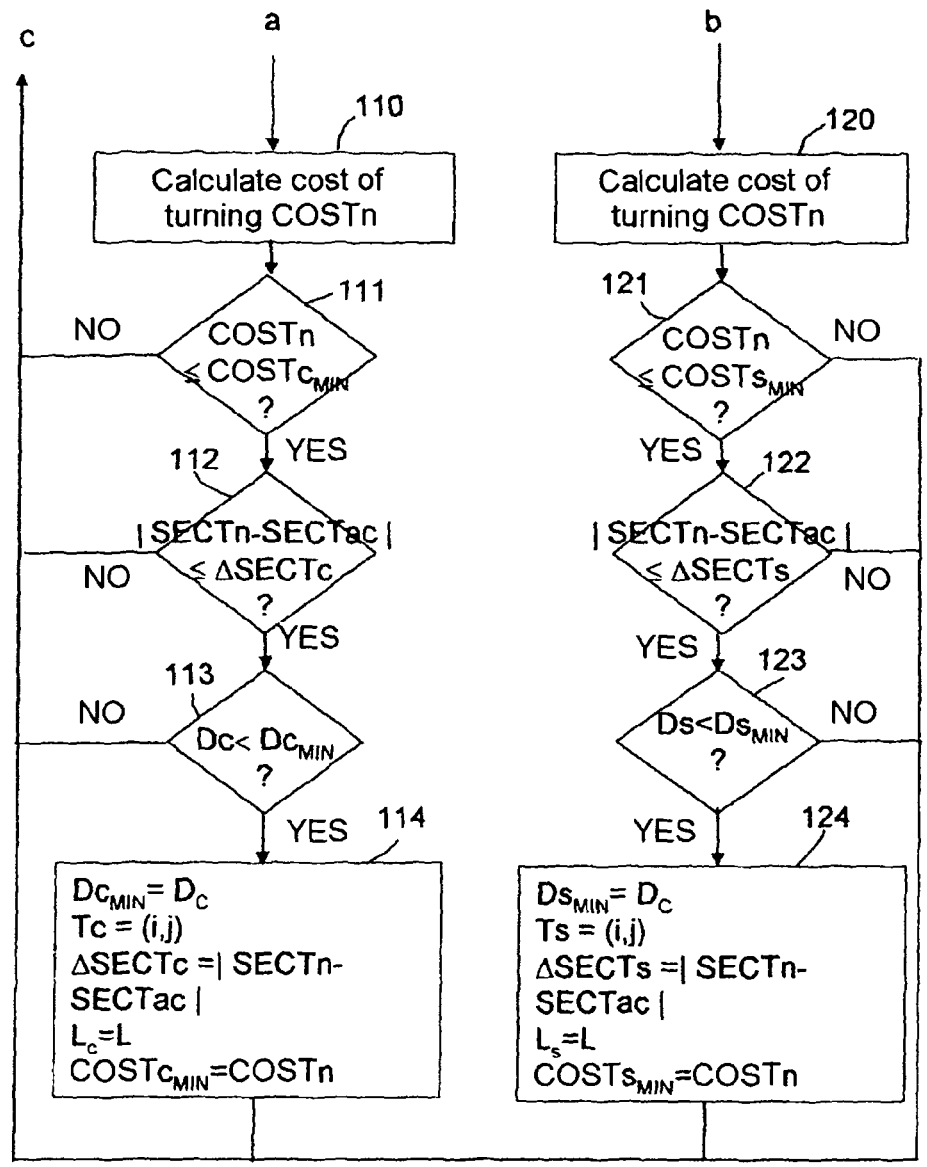

FIGS. 15a and 15b show a chart illustrating the main steps of an algorithm for searching for a point of axis to a zone of free lateral deployment by an optimal joining trajectory applying as main selection criterion, a minimum cost for the initial maneuver of turning and as auxiliary criteria a minimum change of course and a minimum length of joining trajectory. This algorithm does not require the plotting of the trajectories for joining the various mesh cells tested of the location grid. It calls upon a sectioning of the courses orientation rose into elementary angular sectors, as is represented in FIGS. 10 and 13, and upon a sectioning into several superimposed sections, of the space where the aircraft is deploying. The elementary angular sectors of the courses orientation rose are tagged by a numbering increasing from 1 to N over a quadrant revolution, for example, in the clockwise direction with north as initial direction. The sections through the space where the aircraft is deploying are tagged by a numbering L increasing as their reference altitude level diverges from the current altitude level of the aircraft.

The algorithm makes it possible to analyze all the mesh cells of the location grids of the various superposed sections through the space where the aircraft is deploying so as to find those belonging to zones of free lateral deployment (lateral constraint flag set to the value 0) with the smallest costs of initial turning maneuver, the smallest changes of course and, either the smallest shortest distance, or the smallest curvilinear distance. It proceeds by updating the initial choices of two mesh cells, one termed the "shortest mesh cell Ms" and identified by:

an infinite value of shortest distance $D_s$,
an infinite value of altitude level $ALTs_{LEVEL}$,
an infinite value of cost of maneuver $COSTs_{MIN}$,
a value of course deviation $ASECTs$ equal to the total number N of elementary angular sectors, and the other termed the "diverted mesh cell Mc" and identified by:

an infinite value of curvilinear distance $D_c$,
an infinite value of altitude level $ALTc_{LEVEL}$,
an infinite value of cost of maneuver $COSTc_{MIN}$
a value of course deviation $ASECTc$ equal to the total number N of elementary angular sectors, and scanning all the mesh cells of the location grid from a first mesh cell tagged by its coordinates i,j and while taking account of the value SECTac of the current course of the aircraft. It is structured as several interleaved loops:

a first loop of selection, from among the mesh cells of the location grids of the various horizontal sections through the space of deployment of the aircraft, of the mesh cells belonging to zones of free lateral deployment (lateral constraint flag set to the value 0), a second loop of selection and of labeling of a distance variable, selecting from among the mesh cells retained by the first selection loop, those belonging to an elementary angular sector contained, with the two elementary angular sectors alongside it, in a permitted sector and assigning the nature of a shortest distance variable $D_s$ or of a curvilinear distance variable $D_c$ to a distance variable depending on whether or not there is equality between the shortest distance and the curvilinear distance that are assigned to the mesh cell considered, and a third twin loop of comparison of the properties of the mesh cell retained after the two previous selections so as possibly to substitute it for one of the two mesh cells chosen initially.

After the initialization at 90, the first selection loop examines individually, in turn and systematically, all the mesh cells of the location grid in any order of scanning defined by a process for incrementing the coordinates i, j.

This individual examination consists in searching at 91, for the levels of section, by moving away from the current altitude of the aircraft (L increasing) where the mesh cell has a lateral constraint flag set to the value 0 signifying the belonging thereof to a zone of free lateral deployment.

The result is tested at 92.

If the mesh cell examined does not belong, in any section, to a zone of free lateral deployment, (lateral constraint flag set to the value 1 regardless of the level of section)

the mesh cell under examination is changed at 93 by incrementing the coordinates i, j. A new test is undertaken at 94 to ascertain whether all the mesh cells have been examined.

If all the mesh cells have been examined, the execution of the algorithm is ended at 95.

If mesh cells remain to be examined, the mesh cell corresponding to the incremented coordinates is examined in its turn at 91.

If there exists a section level L in which the mesh cell examined belongs to a zone of free lateral deployment (lateral constraint flags set to the value 0 for this section level), the examination of the mesh cell is continued in the section selection loop.

The examination of a mesh cell, in this second selection loop, begins at 100, with the identification of its elementary angular sector SECTn and continues with a test at 101 of whether its elementary angular sector SECTn and the two elementary angular sectors which surround it SECT(n−1) and SECT(n+1) do or do not belong to a permitted sector labeled as empty in the figure.

When any one of the elementary angular sector SECTn or of the two elementary angular sectors which surround it SECT(n−1) or SEC(n+1) do not belong to a permitted sector, the examination of the mesh cell considered is ended and the mesh cell under examination is changed by a return to step 94 of the first selection loop. This test amounts to disposing lateral safety margins around the nonpermitted sectors so as to make sure of remaining a suitable distance from the dangerous and/or forbidden zones.

When the elementary angular sector SECTn and the two elementary angular sectors which surround it SECT(n−1) or SEC(n+1) belong to a permitted sector, the shortest distance Ds and the curvilinear distance Dc which are associated with the mesh cell examined are read at 102 and compared at 103.

If it results from the comparison at 103 that the curvilinear distance Dc is different from the shortest distance Ds, the examination of the mesh cell is continued in branch a of the third comparison loop specialized in the selection of an optimal point of axis, by a diverted trajectory, to a zone of free lateral deployment.

If it results from the comparison at 103 that the curvilinear distance Dc and the shortest distance Ds are equal, the examination of the mesh cell is continued in branch b of the third comparison loop specialized in the selection of an optimal point of access, by a shortest trajectory, to a zone of free lateral deployment.

The examination of the mesh cell is continued in branch a of the third comparison loop by a calculation at 110 of its cost of initial maneuver COSTn, which depends on the conditions of roll of the aircraft and the angular span CD, CG, CR to which the elementary angular sector SECTn of the mesh cell examined belongs. The cost COSTn calculated is thereafter compared at 111 with the minimum cost $COSTc_{MIN}$ of the diverted mesh cell Mc.

If it results from the comparison at 111 that the cost COSTn is greater than the minimum $COSTc_{miN}$ of the diverted mesh cell Mc, the examination of the mesh cell considered is ended and the mesh cell under examination is changed by a return to step 94 of the first selection loop.

If it results from the comparison at 111 that the cost COSTn is less than or equal to the minimum cost $COSTc_{MIN}$ of the diverted mesh cell Mc, the examination of the mesh cell is continued by a comparison at 112 of the value of its course deviation |SECTn−SECTac| with respect to the course deviation ΔSECTc of the diverted mesh cell Mc.

If it results from the comparison at 112 that the course deviation |SECTn−SECTac| is greater than the course deviation ΔSECTc of the diverted mesh cell Mc, the examination of the mesh cell considered is ended and the mesh cell under examination is changed by a return to step 94 of the first selection loop.

If it results from the comparison at 112 that the course deviation |SECTn−SECTac| is less than or equal to the course deviation ΔSECTc of the diverted mesh cell Mc, the examination of the mesh cell is continued by a comparison at 113 of the value of its curvilinear distance Dc with respect to the value of the curvilinear distance $De_{mEN}$ of the diverted mesh cell Mc.

If it results from the comparison at 113 that the curvilinear distance Dc is greater than the curvilinear distance $Dc_{MIN}$ of the diverted mesh cell Mc, the examination of the mesh cell considered is ended and the mesh cell under examination is changed by a return to step 94 of the first selection loop.

If it results from the comparison at 113 that the curvilinear distance Dc is less than or equal to the curvilinear distance $Dc_{MIN}$ of the diverted mesh cell Mc, the mesh cell under examination is taken at 114 as new diverted mesh cell reference Mc. Then the mesh cell under examination is changed by a return to step 94 of the first selection loop.

The examination of the mesh cell is continued in branch b of the third comparison loop by a calculation at 120 of its cost of initial maneuver COSTn, which depends on the conditions of roll or the aircraft and the angular span, CD, CG, CR to which the elementary angular sector SECTn of the mesh cell examined belongs. The cost COSTn calculated is thereafter compared at 121 with the minimum cost $COSTs_{MIN}$ of the shortest mesh cell Ms.

If it results from the comparison at 121 that the cost COSTn is greater than the minimum $COSTc_{miN}$ of the shortest mesh cell Ms, the examination of the mesh cell considered is ended and the mesh cell under examination is changed by a return to step 94 of the first selection loop.

If it results from the comparison at 121 that the cost COSTn is less than or equal to the minimum cost $COSTc_{MIN}$ of the shortest mesh cell Ms, the examination of the mesh cell is continued by a comparison at 122 of the value of its course deviation |SECTn−SECTac| with respect to the course deviation ΔSECTc of the shortest mesh cell Ms.

If it results from the comparison at 122 that the course deviation |SECTn−SECTac| is greater than the course deviation ΔSECTc of the shortest mesh cell Ms, the examination of the mesh cell considered is ended and the mesh cell under examination is changed by a return to step 94 of the first selection loop.

If it results from the comparison at 122 that the course deviation |SECTn−SECTac| is less than or equal to the course deviation ΔSECTc of the shortest mesh cell Ms, the examination of the mesh cell is continued by a comparison at 123 of the value of its shortest distance Ds with respect to the value of the shortest distance $DS_{MIN}$ of the shortest mesh cell Ms.

If it results from the comparison at 123 that the shortest distance Ds is greater than the shortest distance $DS_{MIN}$ of the diverted mesh cell Mc, the examination of the mesh cell considered is ended and the mesh cell under examination is changed by a return to step 94 of the first selection loop.

If it results from the comparison at 213 that the shortest distance Ds is less than or equal to the curvilinear distance $DS_{MIN}$ of the shortest mesh cell Ms, the mesh cell under examination is taken at 114 as new shortest mesh cell reference Ms. Then the mesh cell under examination is changed by a return to step 94 of the first selection loop.

Finally, the above search algorithm makes it possible to extract two mesh cells of the location grid: the shortest mesh cell Ms and the diverted mesh cell Mc. Several cases may arise:

The shortest mesh cell Ms has lost its initialization values. It signals a point of a zone of free lateral deployment accessible by a shortest trajectory considered as having the cost of initial turning maneuver, requiring the smallest change of course among the shortest trajectories making it possible to regain for the same cost of initial maneuver a zone of free lateral deployment and having the smallest length among the shortest trajectories of like cost of maneuver and change of course. The diverted mesh cell Mc is the same as the shortest mesh cell Ms since the shortest distance Ds of the latter is also its curvilinear distance.

The shortest mesh cell Ms has kept its initialization values but the diverted mesh cell Mc has lost them. There has been found only one point of zone of free lateral deployment by a joining trajectory circumventing a dangerous or prohibited zone.

The shortest mesh cell Ms and the diverted mesh cell Mc have kept their initialization values. No point of access to a zone of free lateral deployment has been found.

In the first two cases the point proposed for accessing a zone of free lateral deployment may be accompanied by a joining trajectory proposal.

When the point of access corresponds to a shortest mesh cell Ms, the joining trajectory is a shortest trajectory having, in the vertical plane, a profile which is at the minimum horizontal and more likely climbing so as to allow the joining of the level of altitude of the section in which the zone of free lateral deployment aimed at is situated, and, in the horizontal plane, the profile described in relation to FIG. 11, that is to say a profile composed:

of a first rectilinear segment 82 starting from the current position 80 of the aircraft or rather from a future position leaving the crew a reaction time. It is oriented along the current course of the aircraft and tied to the inertia of the aircraft during the instigation of turning so as to steer towards the aim point 81, of an arc of a cycloid 83, corresponding to the turning of the aircraft pushed by the crosswind until the attaining thereof of the azimuth of the aim point, and of a second rectilinear segment 84 between the exit from the turning and the aim point 81.

The first rectilinear segment 82 due to the inertia of the aircraft during the instigation of turning thereof may be estimated on the basis of the ground speed of the aircraft and of the lag in the instigation of turning ΔR+ΔRR calculated when estimating the cost of the initial maneuver of turning $COSTs_{MIN}$.

The cycloidal arc is defined by relation (1) mentioned previously:

$$\binom{x}{y}(t) = \binom{WS_X \cdot t - \delta.R.\cos(wt + \gamma) + C_X}{WS_Y \cdot t + R.\sin(wt + \gamma) + C_Y} \quad (1)$$

Its end S can be found by noting that this is the point where the ground speed of the aircraft aligns itself with a fixed direction, this being expressed by the colinearity condition:

$$\frac{\dot{y}(t_s)}{\dot{x}(t_s)} = \frac{Y_T - y(t_s)}{X_T - x(t_s)}$$

$Y_{Ts}$ and $X_{Ts}$ being the coordinates of the point of access corresponding to the selected mesh cell Ms,
$y(t_s)$ and $x(t_s)$ being the coordinates of the end point S of the sinusoidal arc, and
$\dot{y}(t_s)$ and $\dot{x}(t_s)$ the components of the ground speed vector of the aircraft at the end S that are obtained by differentiating relation (1):

$$\binom{\dot{x}}{\dot{y}}(t) = \binom{\delta.TAS.\sin(wt) + WS_X}{TAS.\cos(wt) + WS_Y}$$

Finally, the coordinates of the point S of separation between the sinusoidal arc 83 and the second rectilinear segment 84 leading from the exit of the turn to the aim point T corresponding to the mesh cell selected Ms comply with the relation:

$$\frac{[Y_T - y(t_S)] \times \dot{x}(t_S)}{[X_T - x(t_S)] \times \dot{y}(t_S)} = 1$$

The joining trajectory thus defined is then proposed to the crew of the aircraft at the same time as the shortest mesh cell selected Ms.

When only a diverted mesh cell Mc has been selected, the joining trajectory which is not a shortest trajectory since it circumvents a dangerous or prohibited zone may be plotted by the method of determining a route of minimum length in the presence of obstacle described in the French patent application filed by the applicant on 18 Nov. 2003 under n°. 03 13494, which method consists in superimposing two maps of distances: the usual map of distances having as origin of the distance measurements the current position of the aircraft and another map of distances having the aim point as origin of the distance measurements, in adding together the distance values obtained for one and the same mesh cell of the location grid and in choosing as plot of the joining trajectory, a plot following mesh cells assigned a sum of distances having a minimum value.

The invention claimed is:

1. A method of selecting an aircraft access point into a zone of free lateral deployment, comprising:
   a computer determining a minimum cost for a selection, by an aircraft, of an access point to a zone of free lateral deployment, using a criterion of minimum cost, wherein the criterion of minimum cost includes a cost of an initial turning maneuver at a start of a joining trajectory leading from a current position of the aircraft to the access point, the aircraft providing information on its current position and its current course, its angle, current roll acceleration and rate, and a location of the aircraft, with respect to its current position, of at least one of relief contours, of threatening on ground obstacles, and forbidden zones, wherein the determining a minimum cost includes:

evaluating a situation of the aircraft in its environment, comprising:
 determining costs of initial maneuvers of turning to the right and to the left;
 sectioning a space surrounding the current position of the aircraft into three angular azimuthal spans based upon the current course of the aircraft, the three spans including: a front-right span; a front-left span; and a rear span, wherein
  sectioning the space into the front-right span includes assigning a cost of maneuvering of turning to the right,
  sectioning the space into the front-left span includes assigning a cost of maneuvering of turning to the left, and
  sectioning the space into the rear span includes assigning the larger of the values of the costs of maneuvering of turning to the right or to the left; and
 estimating curvilinear distances and shortest distances separating points of zones of free lateral deployment, from the current position of the aircraft, based upon a vertical flight profile for the aircraft and of zones not practicable to circumvent; and
selecting at least one point of access to a zone of free lateral deployment, comprising:
 splitting a space surrounding the current position of the aircraft into permitted and non-permitted azmuthal angular sectors;
 selecting points of the zones of free lateral deployment that are situated in the permitted azimuthal angular sectors;
 analyzing trajectories for joining the selected points of the zone of free lateral deployment; and
 choosing as a joining point, one of the selected points of the zone of free lateral deployment, a starting course having a joining trajectory belonging to the front-right, front-left, or rear span assigned the lowest possible cost of initial maneuvering of turning;
wherein one the determined costs of the initial maneuvers of turning to the right and to the left is the lag required in order for the aircraft to attain a permitted maximum roll angle, to the right for a turn to the right or to the left for a turn to the left.

2. The method according to claim 1, wherein the minimum cost criterion includes a criterion of minimum change of course at the start of the trajectory for joining the access point.

3. The method according to claim 1, wherein the minimum cost criterion includes a criterion of minimum length for the trajectory for joining the access point.

4. The method according to claim 1, wherein the minimum cost criterion includes a criterion of shape of the trajectory for joining the access point making the distinction between the shortest joining trajectories and the joining trajectories circumventing obstacles.

5. The method according to claim 1, wherein one of the costs of the initial turning maneuver is the time of switching, for the aircraft, from its current roll angle to the permitted maximum roll angle on the side desired with a permitted maximum roll rate.

6. The method according to claim 5, wherein a time $\Delta R$ of switching the aircraft from its current roll angle R to a permitted maximum roll angle RM on the desired side with a permitted maximum roll rate RRM, is estimated at the value:

$$\Delta R = \frac{RM - \delta R}{RRM}$$

$\delta$ equaling +1 for a turn to the right and −1 for a turn to the left.

7. The method according to claim 1, wherein one of the costs of the initial turning maneuver is the sum of the time of switching the aircraft from its current roll angle to a permitted maximum roll angle on a desired side, based upon a permitted maximum roll rate, roll acceleration, and deceleration times.

8. The method according to claim 1, wherein one of the costs of the initial turning maneuver is the sum of the time of switching the aircraft from its current roll angle to a permitted maximum roll angle on a desired side, based upon a permitted maximum roll rate, a constant roll acceleration, and a constant deceleration.

9. The method according to claim 8, wherein the times $\Delta RR$ at constant roll acceleration and deceleration RAM are estimated at:

$$\Delta RR = 2 \times \frac{RRM}{RAM},$$

wherein RRM is the permitted maximum roll rate.

10. The method according to claim 1, wherein one of the costs of the initial turning maneuver is zero when a current roll angle R of the aircraft is close to a permitted maximum roll angle on a desired side.

11. The method according to claim 1, wherein one of the costs of the initial turning maneuver is zero when a current roll angle corresponds to at least 95% of a value of a permitted maximum roll angle on a desired side.

12. The method according to claim 1, wherein the front-right, front-left and rear azimuthal angular spans each cover 120 degrees.

13. The method according to claim 1, further comprising:
 locating and delimiting zones forbidden by regulations, and
 locating and delimiting, at levels of altitude of airspace deployed by the aircraft, zones of free lateral deployment a distance from the dangerous or forbidden zones that allows the aircraft to engage without flat lateral maneuvers.

14. The method according to claim 1, wherein, the criterion of minimum cost of initial turning maneuver, when its application leads to several possibilities of choices of selected points of zone of free deployment, is supplemented with a criterion of equality between curvilinear distance and shortest distance, with a criterion of minimum change of course, and with a criterion of minimum length of joining trajectory.

15. The method according to claim 1, wherein lateral safety margins are added each side of the nonpermitted azimuthal sectors and removed from the permitted azimuthal sectors.

16. The method according to claim 1, wherein the space surrounding the current position of the aircraft is sectioned, in the azimuthal plane, into 32 elementary angular sectors.

17. The method according to claim 13, wherein the levels of altitude of airspace lie between the current altitude of the aircraft and a maximum altitude of overflown relief.

18. The method according to claim 13, wherein the levels of altitude of airspace correspond to sections with horizontal profile.

19. The method according to claim 18, wherein the sections are three in number, one at the level of the current altitude of the aircraft, one at the level of the maximum altitude of overflown relief, and an intermediate level between the level of the current altitude and the level of maximum altitude.

20. The method according to claim 1, wherein the selecting of at least one point of access to a zone of free lateral deployment includes overlaying a location grid on a topological map of an overflown region.

21. The method according to claim 20, wherein the location grid is regular distance-wise and aligned with the meridians and parallels.

22. The method according to claim 20, wherein the location grid is regular distance-wise and aligned with the heading of the aircraft.

23. The method according to claim 20, wherein the location grid is regular distance-wise and aligned with the course of the aircraft.

24. The method according to claim 20, wherein the location grip is regular angular-wise and aligned with the meridians and parallels.

25. The method according to claim 20, wherein the location grid is regular angular-wise and aligned with the heading of the aircraft.

26. The method according to claim 20, wherein the location grid is regular angular-wise and aligned with the course of the aircraft.

27. The method according to claim 20, wherein the location grid is radial, centered on the aircraft and oriented along its heading.

28. The method according to claim 20, wherein the location grid is radial, centered on the aircraft and oriented along its course.

* * * * *